United States Patent
Koshikawa

(10) Patent No.: US 10,647,899 B2
(45) Date of Patent: May 12, 2020

(54) HEAT-CURABLE FLUOROPOLYETHER-BASED ADHESIVE COMPOSITION AND ELECTRIC/ELECTRONIC COMPONENT

(71) Applicant: SHIN-ETSU CHEMICAL CO., LTD., Tokyo (JP)

(72) Inventor: Hidenori Koshikawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 122 days.

(21) Appl. No.: 15/967,669

(22) Filed: May 1, 2018

(65) Prior Publication Data
US 2018/0371300 A1   Dec. 27, 2018

(30) Foreign Application Priority Data

Jun. 26, 2017 (JP) .................................. 2017-124324
Oct. 23, 2017 (JP) .................................. 2017-204276

(51) Int. Cl.
| | | |
|---|---|---|
| *C09J 171/02* | (2006.01) | |
| *C08J 3/24* | (2006.01) | |
| *C08L 83/06* | (2006.01) | |
| *C08L 83/08* | (2006.01) | |
| *C08G 65/02* | (2006.01) | |
| *C08G 65/00* | (2006.01) | |
| *C09J 5/06* | (2006.01) | |
| *C09J 171/00* | (2006.01) | |

(52) U.S. Cl.
CPC .......... *C09J 171/02* (2013.01); *C08G 65/007* (2013.01); *C08J 3/24* (2013.01); *C08L 83/06* (2013.01); *C09J 5/06* (2013.01); *C09J 171/00* (2013.01)

(58) Field of Classification Search
CPC ........ C08G 77/04; C08G 77/12; C08G 77/20; C08G 77/24; C08G 62/02; C09J 171/02; C08L 83/06; C08L 83/08
See application file for complete search history.

(56) References Cited

U.S. PATENT DOCUMENTS

| | | |
|---|---|---|
| 5,656,711 A | 8/1997 | Fukuda et al. |
| 5,665,846 A | 9/1997 | Sato et al. |
| 2002/0061969 A1 | 5/2002 | Shiono et al. |
| 2011/0237732 A1 | 9/2011 | Matsuda et al. |
| 2011/0257315 A1 | 10/2011 | Shiono et al. |

FOREIGN PATENT DOCUMENTS

| | | |
|---|---|---|
| JP | 2990646 B2 | 12/1999 |
| JP | 3239717 B2 | 12/2001 |
| JP | 3562578 B2 | 9/2004 |
| JP | 5246190 B2 | 7/2013 |
| JP | 5459033 B2 | 4/2014 |

*Primary Examiner* — Caixia Lu
(74) *Attorney, Agent, or Firm* — Birch, Stewart, Kolasch & Birch, LLP

(57) ABSTRACT

Provided are a heat-curable fluoropolyether-based adhesive composition capable of being cured and adhering to various kinds of base materials made of, for example, a metal, ceramic and/or plastic in a short period of time; and an electric/electronic component employing the same. The composition is a heat-curable fluoropolyether-based adhesive composition having, as an adhesion imparting agent, an alicyclic epoxy group-containing and fluorine-containing organohydrogensiloxane having in one molecule: a monovalent perfluoroalkyl or perfluorooxyalkyl group(s), or a divalent perfluoroalkylene or perfluorooxyalkylene group(s); and at least one silicon atom-bonded hydrogen atom (SiH group).

10 Claims, No Drawings

HEAT-CURABLE FLUOROPOLYETHER-BASED ADHESIVE COMPOSITION AND ELECTRIC/ELECTRONIC COMPONENT

BACKGROUND OF THE INVENTION

Field of the Invention

The present invention relates to a heat-curable fluoropolyether-based adhesive composition; and an electric/electronic component employing the same.

Background Art

Conventionally, there has been proposed, as a fluorine-containing curable composition, a composition (Japanese Patent No. 2990646) containing: a linear fluoropolyether compound having at least two alkenyl groups in one molecule, and a perfluoropolyether structure in its main chain; a fluorine-containing organohydrogensiloxane having at least two silicon atom-bonded hydrogen atoms in one molecule; and a platinum group metal compound. In addition, it is known that there can be obtained from such composition a cured product exhibiting an excellent balance between, for example, heat resistance, chemical resistance, solvent resistance, mold releasability, water repellency, oil repellency and low-temperature property.

Further, as a composition capable of being turned into a cured product with an acid resistance even superior to that of the cured product obtained from the composition described in Japanese Patent No. 2990646, there has also been proposed a composition (Japanese Patent No. 5246190) containing a modified linear fluoropolyether compound.

Here, there have also been proposed compositions (Japanese Patent No. 3239717 and Japanese Patent No. 5459033) prepared by adding to the above compositions an organopolysiloxane having: a hydrosilyl group(s); and an epoxy group(s) and/or a trialkoxysilyl group(s). These compositions are thus capable of expressing a self-adhesiveness to metal and plastic base materials.

Moreover, there have also been proposed compositions (Japanese Patent No. 3562578) prepared by adding to these self-adhesive compositions an organosiloxane having cyclic carboxylic acid anhydride residues. These compositions thus have an improved adhesiveness.

However, in order for these self-adhesive compositions to be cured and express adhesiveness, there are required a curing temperature of not lower than 150° C. and a curing time of not shorter than an hour. In the case of electric/electronic components, especially vehicular components, it has been desired that the manufacturing time (takt time) thereof be shortened in terms of productivity improvement, and that a curing time of an adhesive agent used in these components be shortened as well.

SUMMARY OF THE INVENTION

It is an object of the present invention to provide: a heat-curable fluoropolyether-based adhesive composition capable of being cured in a short period of time, and turned into a cured product adhering to various kinds of base materials made of metals, ceramics, plastics or the like; and an electric/electronic component employing such composition.

The inventors of the present invention diligently conducted a series of studies to solve the above problem, and completed the invention as follows. That is, the inventors found that by using, as an adhesion imparting agent, an alicyclic epoxy group-containing and fluorine-containing organohydrogensiloxane having in one molecule: a monovalent perfluoroalkyl or perfluorooxyalkyl group(s), or a divalent perfluoroalkylene or perfluorooxyalkylene group(s); and at least one silicon atom-bonded hydrogen atom (SiH group), there could be obtained a heat-curable fluoropolyether-based adhesive composition capable of being cured in a short period of time, and turned into a cured product adhering to base materials made of metals, ceramics, plastics or the like.

Thus, the present invention is to provide the following heat-curable fluoropolyether-based adhesive composition; and an electric/electronic component using the same.

[1]

A heat-curable fluoropolyether-based adhesive composition comprising:

(A) 100 parts by mass of a linear polyfluoro compound having at least two alkenyl groups in one molecule, and a perfluoropolyether structure in a main chain;

(B) an alicyclic epoxy group-free and fluorine-containing organohydrogensiloxane having in one molecule: a monovalent perfluoroalkyl or perfluorooxyalkyl group(s), or a divalent perfluoroalkylene or perfluorooxyalkylene group(s); and at least two silicon atom-bonded hydrogen atoms (SiH groups), the component (B) being in an amount at which the SiH groups therein are in an amount of 0.3 to 3 mol per 1 mol of the alkenyl groups in the component (A);

(C) an alicyclic epoxy group-containing and fluorine-containing organohydrogensiloxane having in one molecule: a monovalent perfluoroalkyl or perfluorooxyalkyl group(s), or a divalent perfluoroalkylene or perfluorooxyalkylene group(s); and at least one silicon atom-bonded hydrogen atom (SiH group), the component (C) being in an amount at which the SiH group(s) therein are in an amount of 0.01 to 2 mol per 1 mol of the alkenyl groups in the component (A); and (D) a platinum group metal-based catalyst, the component (D) being in an amount of 0.1 to 2,000 ppm in terms of mass of platinum group metal atoms with respect to the component (A).

[2]

The heat-curable fluoropolyether-based adhesive composition according to [1], further comprising:

(E) a carboxylic acid anhydride, the component (E) being in an amount of 0.010 to 10.0 parts by mass per 100 parts by mass of the component (A).

[3]

The heat-curable fluoropolyether-based adhesive composition according to [1] or [2], wherein the alkenyl groups are contained in the linear polyfluoro compound as the component (A) by an amount of 0.005 to 0.3 mol/100 g.

[4]

The heat-curable fluoropolyether-based adhesive composition according to any one of [1] to [3], wherein the perfluoropolyether structure in the component (A) includes a structure represented by the following general formula (1):

$$—(C_aF_{2a}O)_b— \quad (1)$$

wherein a represents an integer of 1 to 6, and b represents an integer of 1 to 300.

[5]

The heat-curable fluoropolyether-based adhesive composition according to any one of [1] to [4], wherein the component (A) comprises a linear polyfluoro compound represented by the following general formula (2) and/or a linear polyfluoro compound represented by the following general formula (3):

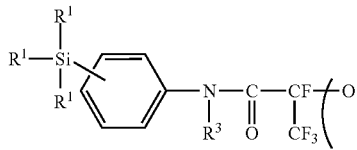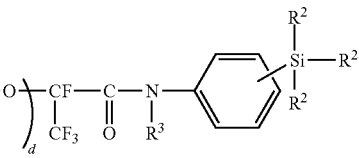

(2)

wherein each of $R^1$ and $R^2$ represents an alkenyl group, or a substituted or unsubstituted monovalent hydrocarbon group having no aliphatic unsaturated bond, where $R^1$s are independent from one another, $R^2$s are also independent from one another, and at least two of these $R^1$s and $R^2$s in total are alkenyl groups; each $R^3$ independently represents a hydrogen atom, or a substituted or unsubstituted monovalent hydrocarbon group; each of c and d represents an integer of 1 to 150, provided that an average value of c+d is 2 to 300; and e represents an integer of 1 to 6,

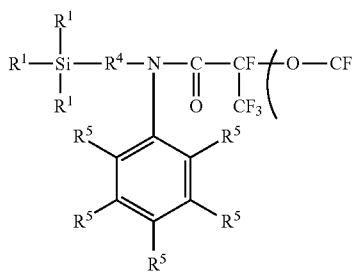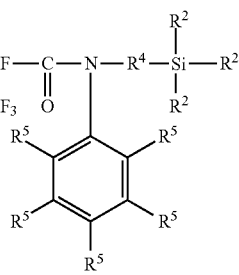

(3)

wherein each $R^4$ independently represents an alkylene group having 1 to 6 carbon atoms; each $R^5$ independently represents a hydrogen atom, or an alkyl group that has 1 to 4 carbon atoms and may be fluorine-substituted; each of $R^1$ and $R^2$ represents an alkenyl group, or a substituted or unsubstituted monovalent hydrocarbon group having no aliphatic unsaturated bond, where $R^1$s are independent from one another, $R^2$s are also independent from one another, and at least two of these $R^1$s and $R^2$s in total are alkenyl groups; each of c and d represents an integer of 1 to 150, provided that an average value of c+d is 2 to 300; and e represents an integer of 1 to 6.

[6]

The heat-curable fluoropolyether-based adhesive composition according to any one of [1] to [5], wherein the alicyclic epoxy group contained in the component (C) is an epoxycyclohexyl group represented by the following formula (4):

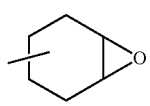

(4)

[7]

An electric/electronic component having a cured product of the heat-curable fluoropolyether-based adhesive composition as set forth in any one of [1] to [6].

[8]

The electric/electronic component according to [7], wherein the electric/electronic component is a vehicular electric/electronic component.

The heat-curable fluoropolyether-based adhesive composition of the present invention contains the above components (A) to (D), and can thus be cured in a short period of time and turned into a cured product adhering to various kinds of base materials made of metals, ceramics, plastics or the like.

DETAILED DESCRIPTION OF THE INVENTION

The present invention is described in detail hereunder.
Component (A)

A component (A) is a linear polyfluoro compound having at least two alkenyl groups in one molecule, and a perfluoropolyether structure in its main chain.

It is preferred that the alkenyl groups contained in the component (A) be those each having 2 to 8 carbon atoms, particularly 2 to 6 carbon atoms, as well as a $CH_2=CH-$ structure at its end. Examples of such alkenyl groups include a vinyl group, an allyl group, a propenyl group, an isopropenyl group, a butenyl group and a hexenyl group, among which a vinyl group and an allyl group are particularly preferred.

It is preferred that the alkenyl groups be contained in the linear polyfluoro compound as the component (A) by an amount of 0.005 to 0.3 mol/100 g, more preferably 0.007 to 0.2 mol/100 g. When the amount of such alkenyl groups contained is not smaller than 0.005 mol/100 g, the degree of cross-linking of the composition of the invention is sufficient such that there exists no concern that curing failures may occur. Further, when the amount of the alkenyl groups contained is not larger than 0.3 mol/100 g, there exists no concern that the mechanical properties of a cured product obtained by curing the composition of the invention may be impaired.

The perfluoropolyether structure in the component (A) has a large number of repeating units each represented by:

  (0)

In the formula (0), a represents an integer of 1 to 6.

The perfluoropolyether structure itself in the component (A) is thus, for example, represented by the following general formula (1):

  (1)

In the formula (1), a represents an integer of 1 to 6; b represents an integer of 1 to 300, preferably an integer of 1 to 200.

In the formula (2), each of $R^1$ and $R^2$ represents an alkenyl group, or a substituted or unsubstituted monovalent hydrocarbon group having no aliphatic unsaturated bond, where $R^1$s are independent from one another, $R^2$s are also independent from one another, and at least two of these $R^1$s and $R^2$s in total are alkenyl groups; each $R^3$ independently represents a hydrogen atom, or a substituted or unsubstituted monovalent hydrocarbon group; each of c and d represents an integer of 1 to 150, provided that an average value of c+d is 2 to 300; and e represents an integer of 1 to 6.

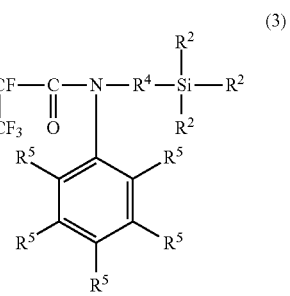

(3)

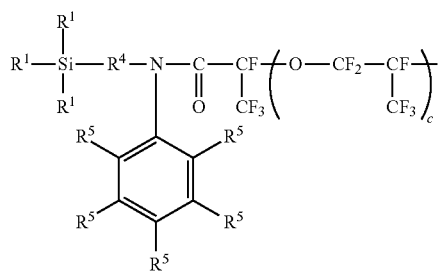

Examples of such repeating unit —$C_aF_{2a}O$— include those represented by the following formulae.

—$CF_2O$—,

—$CF_2CF_2O$—,

—$CF_2CF_2CF_2O$—,

—$CF(CF_3)CF_2O$—,

—$CF_2CF_2CF_2CF_2O$—,

—$CF_2CF_2CF_2CF_2CF_2CF_2O$—,

—$C(CF_3)_2O$—

Among these examples, particularly preferred are the repeating units represented by the following formulae.

—$CF_2O$—,

—$CF_2CF_2O$—,

—$CF_2CF_2CF_2O$—,

—$CF(CF_3)CF_2O$—

Here, the perfluoropolyether structure in the component (A) may be composed of only kind of the above repeating units, or two or more kinds of them.

Preferable examples of the component (A) include linear polyfluoro compounds represented by the following general formulae (2) and (3).

In the formula (3), each $R^4$ independently represents an alkylene group having 1 to 6 carbon atoms; each $R^5$ independently represents a hydrogen atom, or an alkyl group that has 1 to 4 carbon atoms and may be fluorine-substituted. Further, each of $R^1$ and $R^2$ represents an alkenyl group, or a substituted or unsubstituted monovalent hydrocarbon group having no aliphatic unsaturated bond, where $R^1$s are independent from one another, $R^2$s are also independent from one another, and at least two of these $R^1$s and $R^2$s in total are alkenyl groups; each of c and d represents an integer of 1 to 150, provided that an average value of c+d is 2 to 300; and e represents an integer of 1 to 6.

Here, examples of the alkenyl groups represented by $R^1$ and $R^2$ include those listed as the examples of the alkenyl groups contained in the component (A). Other than such alkenyl groups, as the substituted or unsubstituted monovalent hydrocarbon group having no aliphatic unsaturated bond, those having 1 to 12 carbon atoms are preferred, especially, those having 1 to 10 carbon atoms are preferred. Specific examples of such monovalent hydrocarbon group include alkyl groups such as a methyl group, an ethyl group, a propyl group, a butyl group, a hexyl group, a cyclohexyl group and an octyl group; aryl groups such as a phenyl group and a tolyl group; aralkyl groups such as a benzyl group and a phenylethyl group; and monovalent hydrocarbon groups prepared by substituting a part of or all the hydrogen atoms in any of these groups with halogen atoms such as fluorine (2)

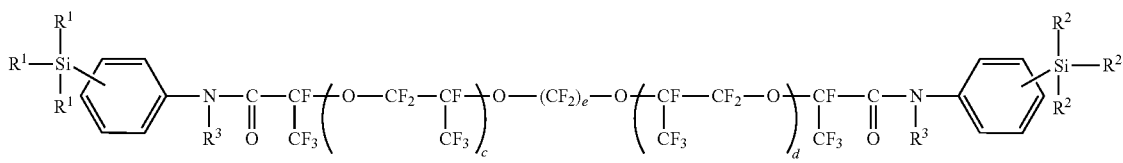

atoms. As $R^1$ and $R^2$, a vinyl group, an allyl group, a methyl group and an ethyl group are particularly preferred.

Examples of the substituted or unsubstituted monovalent hydrocarbon group represented by $R^3$ include groups listed as the examples of the substituted or unsubstituted monovalent hydrocarbon group having no aliphatic unsaturated bond, as represented by $R^1$ and $R^2$. As $R^3$, a hydrogen atom, a methyl group and an ethyl group are preferred.

$R^4$ represents an alkylene group having 1 to 6 carbon atoms, preferably 2 to 6 carbon atoms. Specific examples of such alkylene group include a methylene group, an ethylene group, a propylene group (trimethylene group, methylethylene group), a butylene group (tetramethylene group, methylpropylene group), and a hexamethylene group, among which an ethylene group and a propylene group are preferred.

Each $R^5$ independently represents a hydrogen atom, or an alkyl group that has 1 to 4 carbon atoms and may be fluorine-substituted. Specific examples of such alkyl group that has 1 to 4 carbon atoms and may be fluorine-substituted include alkyl groups such as a methyl group, an ethyl group, a propyl group and a butyl group; and groups prepared by substituting a part of or all the hydrogen atoms in any of these groups with fluorine atoms, such as a trifluoromethyl group. Particularly, a hydrogen atom is preferred.

Further, it is preferred that each of c and d represent an integer of 1 to 150, more preferably an integer of 1 to 100, provided that an average value of c+d is preferably 2 to 300, more preferably 2 to 200. Furthermore, it is preferred that e represent an integer of 1 to 6, more preferably an integer of 1 to 4.

Specific examples of the linear polyfluoro compound represented by the general formula (2) include those represented by the following formulae. Here, Me represents a methyl group, and Et represents an ethyl group.

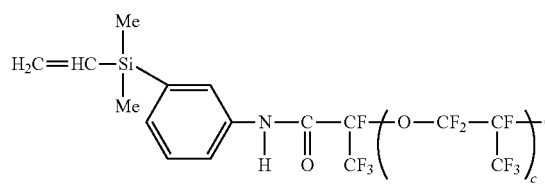
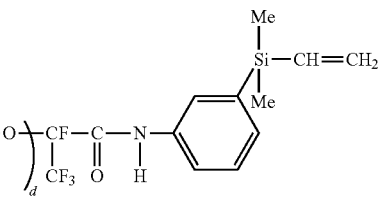

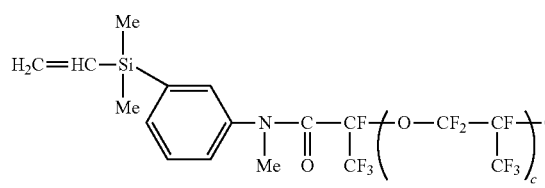
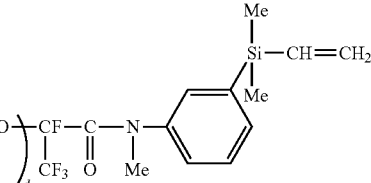

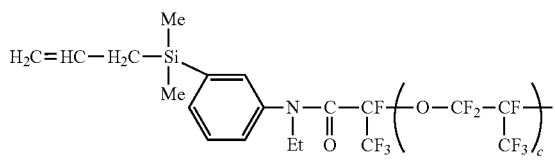
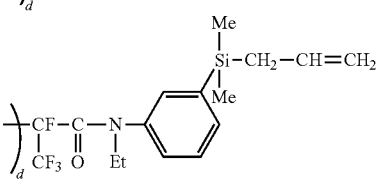

In the above formulae, each of c and d represents an integer of 1 to 150.

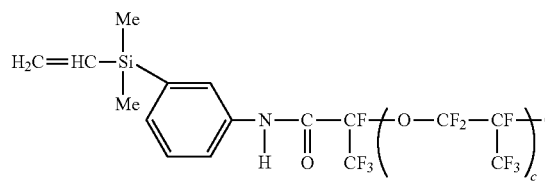
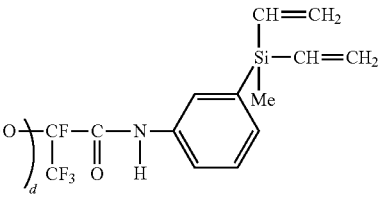

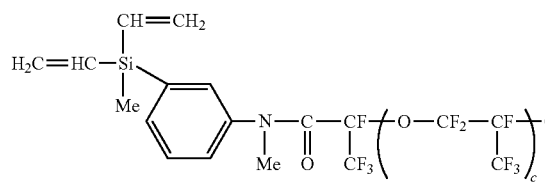
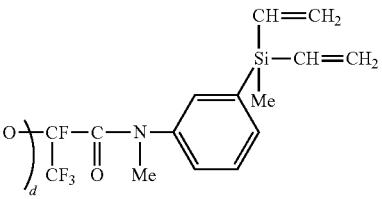

-continued
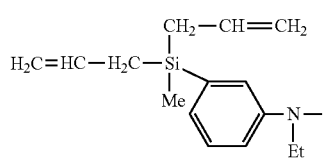
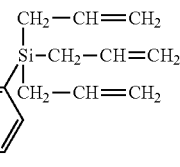
In the above formulae, each of c and d represents an integer of 1 to 150.
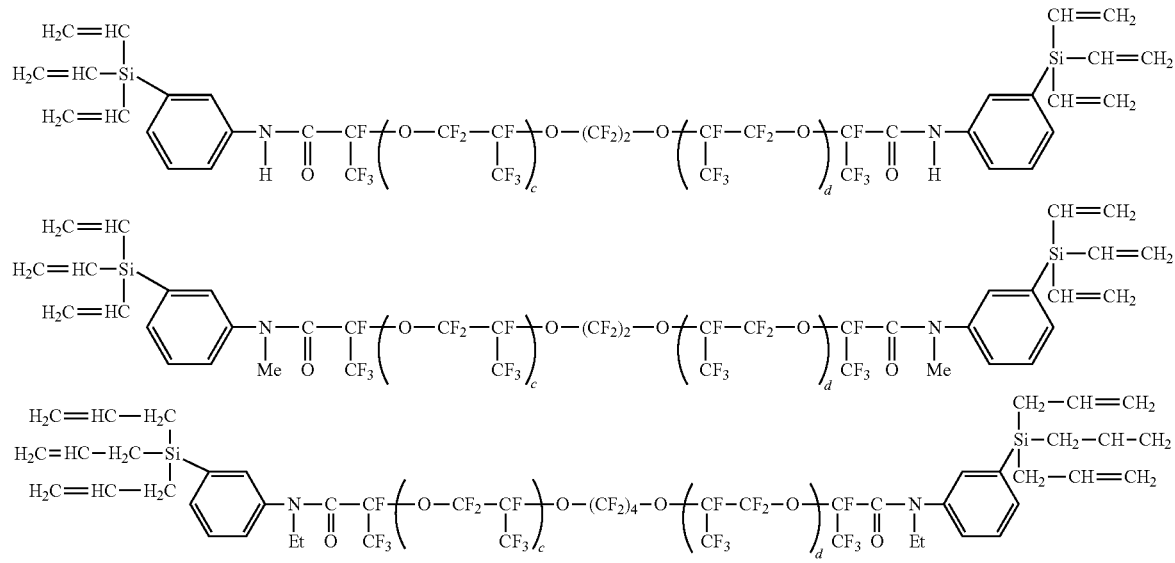
In the above formulae, each of c and d represents an integer of 1 to 150.
Further, specific examples of the linear polyfluoro compound represented by the general formula (3) include those represented by the following formulae.
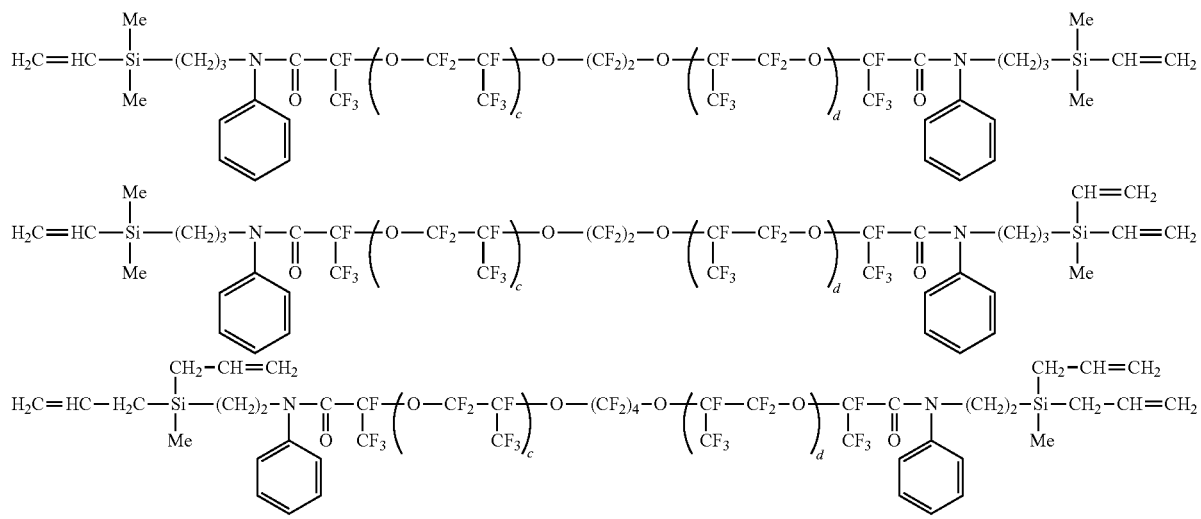
In the above formulae, each of c and d represents an integer of 1 to 100.

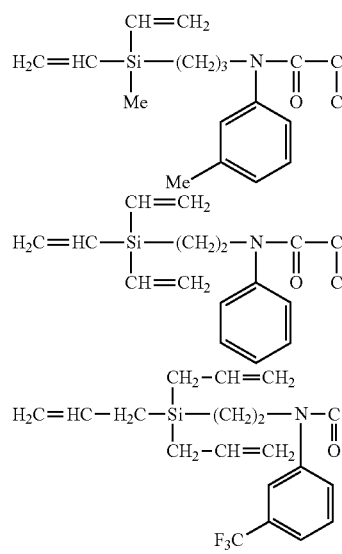
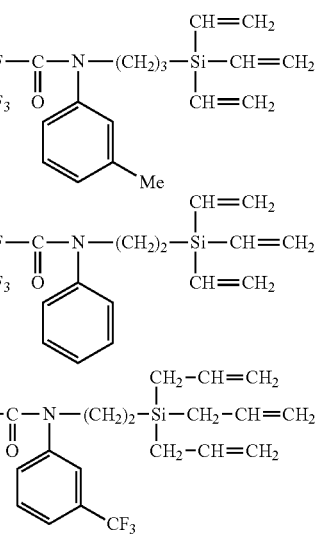

In the above formulae, each of c and d represents an integer of 1 to 100.

Here, in the present invention, viscosity can be measured by a rotary viscometer (e.g. BL-type, BH-type, BS-type, cone-plate type and rheometer type). Especially, it is preferred that the viscosity (23° C.) of the linear polyfluoro compound represented by the above general formula (2) or (3) be 500 to 100,000 mPa·s, particularly 1,000 to 50,000 mPa·s, when measured in accordance with a viscosity measurement method provided in JIS K7117-1. When this viscosity is not lower than 500 mPa·s, there does not exist a concern that the storage stability of the composition of the invention may be impaired; when this viscosity is not higher than 100,000 mPa·s, there does not exist a concern that the extensibility of the composition obtained may be impaired.

Further, the polymerization degree (or molecular weight) of the linear polyfluoro compound that is associated with, for example, the number of the perfluorooxyalkylene units repeated (these perfluorooxyalkylene units composing the perfluoropolyether structure in the main chain), can be obtained as, for example, a number-average polymerization degree (or number-average molecular weight) in terms of polystyrene via a gel permeation chromatography (GPC) analysis using a fluorine-based solvent as a developing solvent.

Any one of these linear polyfluoro compounds may be used singularly, or two or more kinds of them may be used in combination. That is, with regard to the type of the linear polyfluoro compound represented by either the general formula (2) or the general formula (3), one kind of any of the two types may be used singularly, or two or more kinds of any of the two types may be used in combination. Further, the two types of the linear polyfluoro compounds represented by the general formulae (2) and (3) may be used in combination.

Component (B)

A component (B) is an alicyclic epoxy group-free and fluorine-containing organohydrogensiloxane having in one molecule: a monovalent perfluoroalkyl or perfluorooxyalkyl group(s), or a divalent perfluoroalkylene or perfluorooxyalkylene group(s); and at least two silicon atom-bonded hydrogen atoms (hydrosilyl groups (SiH groups)). It is preferred that such fluorine-containing organohydrogensiloxane be that capable of acting as a cross-linking agent of the component (A), and having in one molecule: at least one monovalent or divalent fluorine-containing organic group described above (i.e. monovalent perfluoroalkyl or perfluorooxyalkyl group, or divalent perfluoroalkylene or perfluorooxyalkylene group); at least two silicon atom-bonded hydrogen atoms; and no functional groups other than SiH groups, such functional groups including alicyclic epoxy groups, cyclic carboxylic acid anhydride residues and the like. Particularly, the component (B) clearly differs from any of the later-described components (C) and (E) in that the component (B) at least does not contain in its molecule alicyclic epoxy groups and cyclic carboxylic acid anhydride residues.

Here, "functional groups other than SiH groups" do not include, for example, divalent polar groups (polar structures) such as an ether bond oxygen atom, an amide bond, a carbonyl bond and an ester bond that may be contained in a divalent linking group linking a perfluoroalkyl group, perfluorooxyalkyl group, perfluoroalkylene group or perfluorooxyalkylene group with a silicon atom(s) composing polysiloxane.

The aforementioned monovalent perfluoroalkyl group, monovalent perfluorooxyalkyl group, divalent perfluoroalkylene group and divalent perfluorooxyalkylene group are groups that are introduced in terms of, for example, compatibility, dispersibility and post-curing homogeneity with respect to the component (A).

Examples of the monovalent perfluoroalkyl group or the monovalent perfluorooxyalkyl group include groups represented by the following general formulae (5) or (6).

In the formula (5), f represents an integer of 1 to 10, preferably an integer of 3 to 7.

In the formula (6), g represents an integer of 1 to 50, preferably an integer of 2 to 30.

Further, examples of the divalent perfluoroalkylene group or the divalent perfluorooxyalkylene group include groups represented by the following general formulae (7) to (9).

$$—C_hF_{2h}— \quad (7)$$

In the formula (7), h represents an integer of 1 to 20, preferably an integer of 2 to 10.

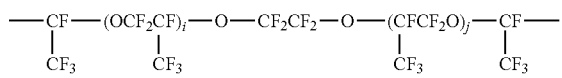
$$(8)$$

In the formula (8), each of i and j represents an integer of not smaller than 1, preferably an integer of 1 to 100, provided that an average value of i+j is 2 to 200, preferably 2 to 100.

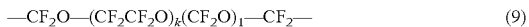
$$—CF_2O—(CF_2CF_2O)_k(CF_2O)_l—CF_2— \quad (9)$$

In the formula (9), each of k and l represents an integer of 1 to 50, preferably an integer of 1 to 30, provided that an average value of k+l is 2 to 100, preferably 2 to 80. The repeating units may be randomly bonded to one another.

Further, it is preferred that these perfluoroalkyl group, perfluorooxyalkyl group, perfluoroalkylene group or perfluorooxyalkylene group be linked to silicon atoms through a divalent linking group. It is preferred that such divalent linking group be a substituted or unsubstituted divalent hydrocarbon group that has 2 to 13 carbon atoms, especially 2 to 8 carbon atoms, and may contain an oxygen atom, nitrogen atom or silicon atom. Specific examples of such divalent linking group include: an alkylene group, an arylene group and a combination thereof; or groups prepared by interposing into these groups, for example, at least one kind of structure selected from the group consisting of an ether bond oxygen atom, an amide bond, a carbonyl bond, an ester bond and a diorganosilylene group such as a dimethylsilylene group. The following groups each having 2 to 13 carbon atoms may thus be the examples of the divalent liking group.

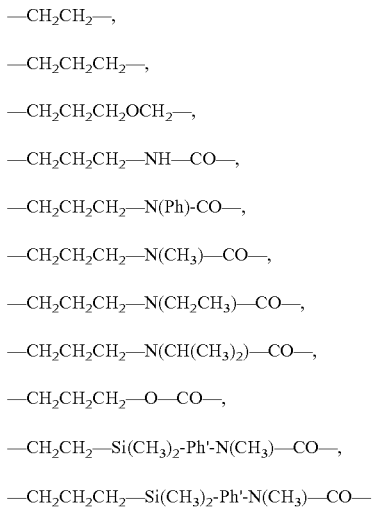

Provided that Ph represents a phenyl group, and Ph' represents a phenylene group.

Further, the monovalent or divalent fluorine-containing organic group(s); and a silicon atom-bonded monovalent substituent group(s) other than the silicon-bonded hydrogen atoms, in the fluorine-containing organohydrogensiloxane as the component (B), are substituted or unsubstituted alkyl or aryl groups each having 1 to 20, preferably 1 to 12 carbon atoms, examples of which include alkyl groups such as a methyl group, an ethyl group, a propyl group, a butyl group, a hexyl group, a cyclohexyl group, an octyl group and a decyl group; aryl groups such as a phenyl group, a tolyl group and a naphthyl group; and groups prepared by substituting a part of or all the hydrogen atoms in any of these groups with, for example, cyano groups and/or halogen atoms such as chlorine atoms, the groups thus prepared including a chloromethyl group, a chloropropyl group and a cyanoethyl group. Among the above examples, a methyl group is preferred.

The structure of the fluorine-containing organohydrogensiloxane as the component (B) may be a cyclic structure, a chain structure, a three-dimensional network structure, or a combination thereof. Although there are no particular restrictions on the number of the silicon atoms in such fluorine-containing organohydrogensiloxane, this number is normally about 2 to 60, preferably about 3 to 30, more preferably about 4 to 30.

Further, the component (B) has at least two SiH groups in one molecule, and it is preferred that these SiH groups be contained in an amount of 0.01 to 1 mol/100 g, more preferably 0.02 to 0.9 mol/100 g.

Examples of the component (B) include those represented by the following general formulae (10) to (16).

$$(10)$$

In the formula (10), each A independently represents the abovementioned monovalent perfluoroalkyl or perfluorooxyalkyl group that is bonded to silicon atoms composing polysiloxane, through the divalent hydrocarbon group that may contain an oxygen atom, nitrogen atom or silicon atom. Examples of such monovalent perfluoroalkyl or perfluorooxyalkyl group include those represented by the above general formulae (5) or (6). $R^6$ independently represents a substituted or unsubstituted alkyl or aryl group having 1 to 20 carbon atoms, preferably 1 to 12 carbon atoms. Further, m represents an integer of 2 to 6, preferably an integer of 3 to 6; n represents an integer of 1 to 4, preferably an integer of 1 to 3, provided that m+n is an integer of 4 to 10, preferably an integer of 4 to 9. Here, there is no restriction on the binding order of —(Si(H)(R$^6$)O)— and —(Si(A)(R$^6$)O)—.

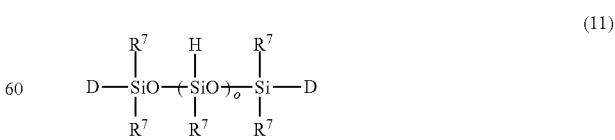
$$(11)$$

In the formula (11), each D is independently identical to A as above; each $R^7$ is independently identical to $R^6$ as above. Further, o represents an integer of 2 to 50, preferably an integer of 3 to 30.

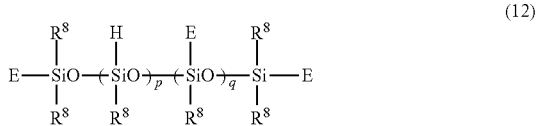
(12)

In the formula (12), each E is independently identical to A as above; each $R^8$ is independently identical to $R^6$ as above. p represents an integer of 2 to 50, preferably an integer of 3 to 30; q represents an integer of 1 to 40, preferably an integer of 1 to 20, provided that p+q is an integer of 4 to 60, preferably an integer of 4 to 50. Here, there is no restriction on the binding order of —(Si(H)($R^8$)O)— and —(Si(E)($R^8$)O)—.

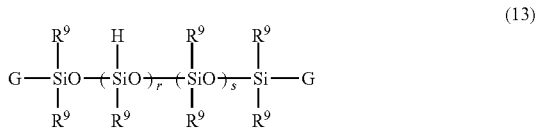
(13)

In the formula (13), each G is independently identical to A as above; each $R^9$ is independently identical to $R^6$ as above. r represents an integer of 2 to 50, preferably an integer of 3 to 30; s represents an integer of 1 to 40, preferably an integer of 1 to 20, provided that r+s is an integer of 4 to 60, preferably an integer of 4 to 50. Here, there is no restriction on the binding order of —(Si(H)($R^9$)O)— and —(Si($R^9$)$_2$O)—.

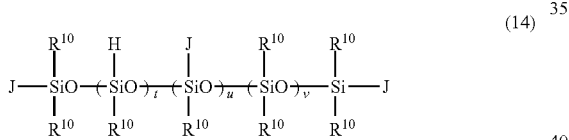
(14)

In the formula (14), each J is independently identical to A as above; each $R^{10}$ is independently identical to $R^6$ as above. t represents an integer of 2 to 50, preferably an integer of 3 to 30; u represents an integer of 1 to 40, preferably an integer of 1 to 20; v represents an integer of 1 to 40, preferably an integer of 1 to 20, provided that t+u+v is an integer of 5 to 60, preferably an integer of 5 to 50. Here, there is no restriction on the binding order of —(Si(H)($R^{10}$)O)-, —(Si(J)($R^{10}$)O)— and —(Si($R^{10}$)$_2$O)—.

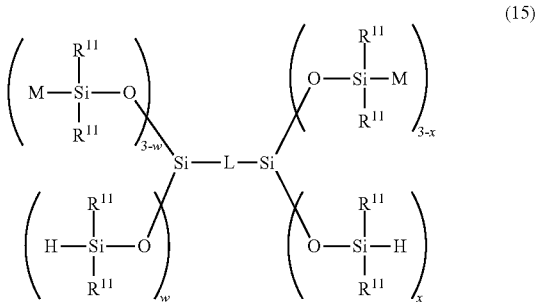
(15)

In the formula (15), L represents an oxygen atom; an alkylene group; or a divalent perfluoroalkylene or perfluorooxyalkylene group that is bonded to silicon atoms through a divalent hydrocarbon group that may contain an oxygen atom or nitrogen atom. Examples of such divalent perfluoroalkylene or perfluorooxyalkylene group include any of those represented by the above general formulae (7) or (9). Each M is independently identical to A as above; each $R^{11}$ is independently identical to $R^6$ as above. Further, w represents 0 or an integer of 1 to 3; x represents 0 or an integer of 1 to 3, provided that w+x is an integer of 2 to 6, preferably an integer of 3 to 5.

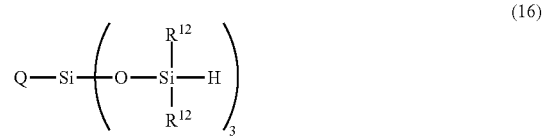
(16)

In the formula (16), Q is identical to A as above; each $R^{12}$ is independently identical to $R^6$ as above.

Specific examples of the component (B) include the following compounds. Any one kind of these compounds may be used singularly, or two or more kinds of them may be used in combination. In the following formulae, Me represents a methyl group, and Ph represents a phenyl group.

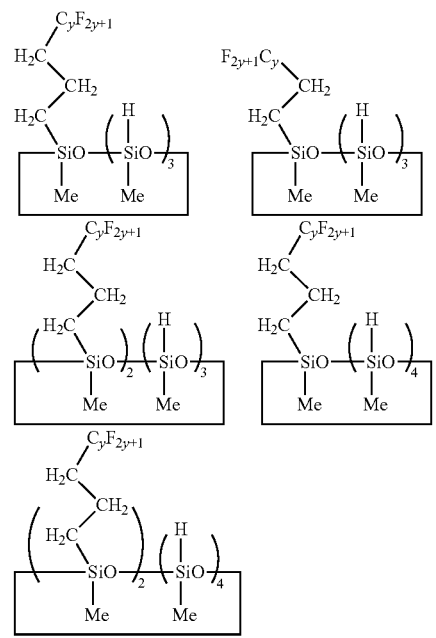

In the above formulae, y represents an integer of 1 to 10.

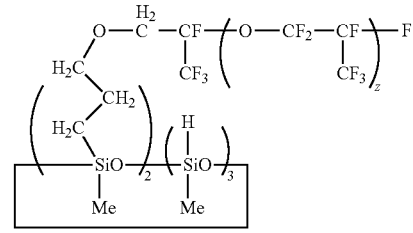

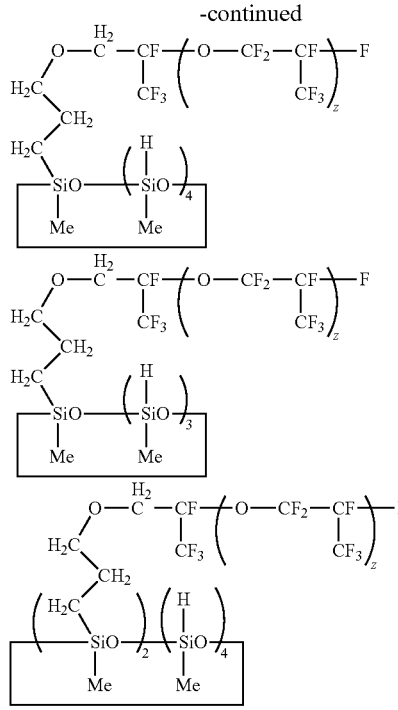
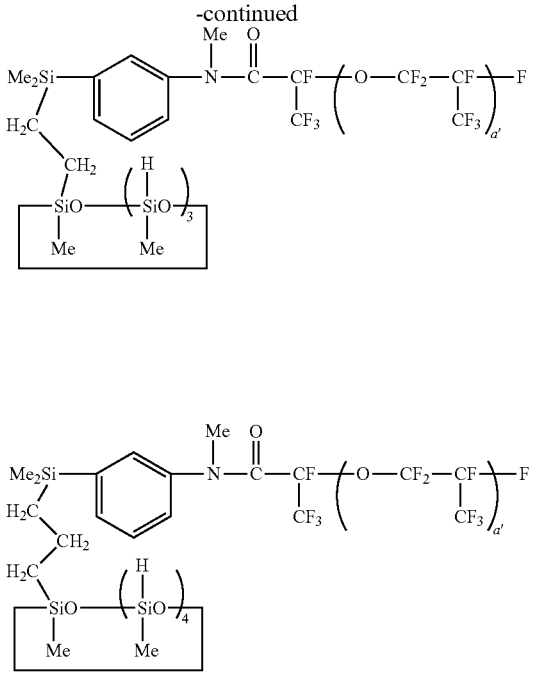
In the above formulae, z represents an integer of 1 to 50.
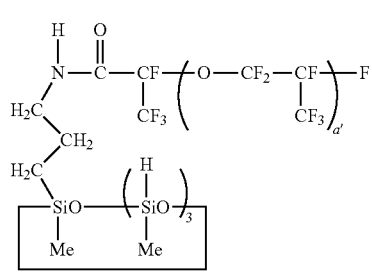
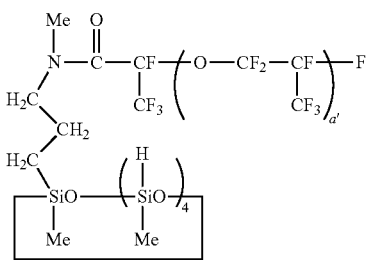
In the above formulae, a' represents an integer of 1 to 50.
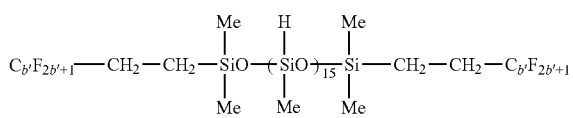
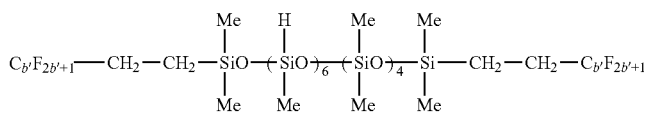
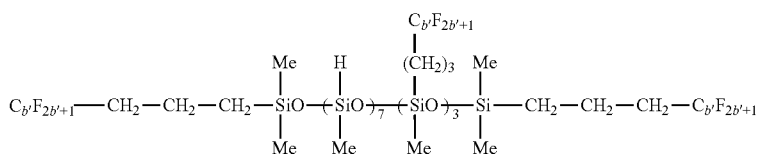
In the above formulae, b' represents an integer of 1 to 10.

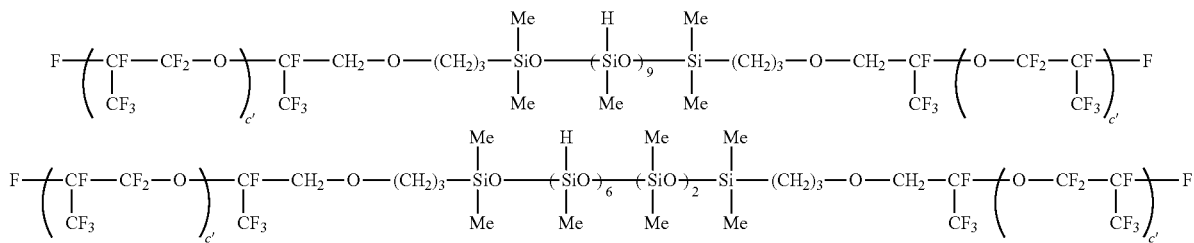
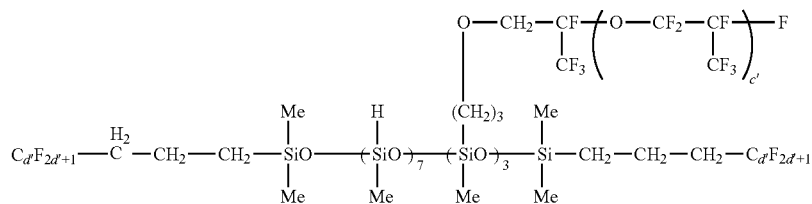
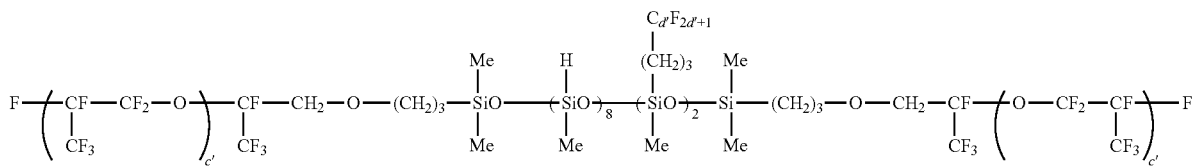
In the above formulae, c' represents an integer of 1 to 50; d' represents an integer of 1 to 10.
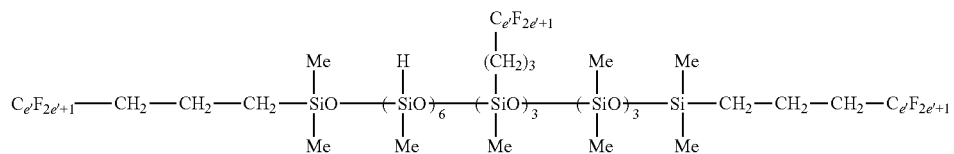
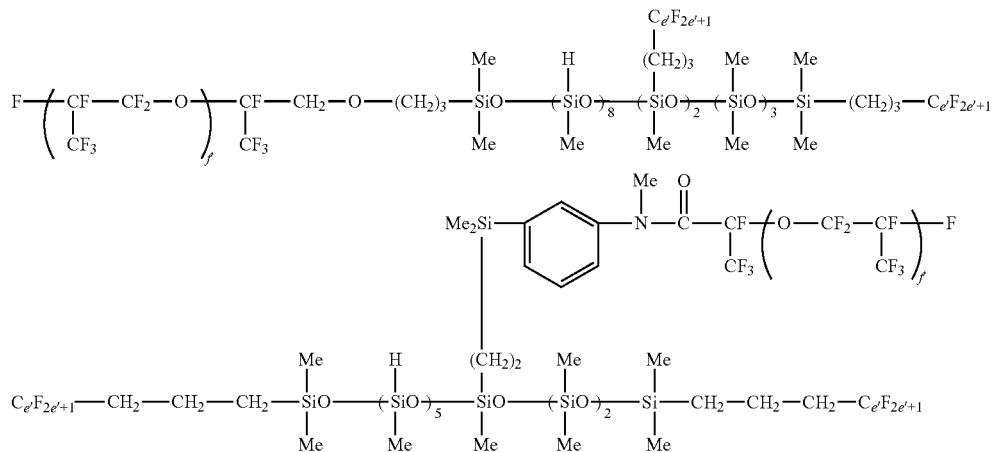
In the above formulae, e' represents an integer of 1 to 10; f' represents an integer of 1 to 50.

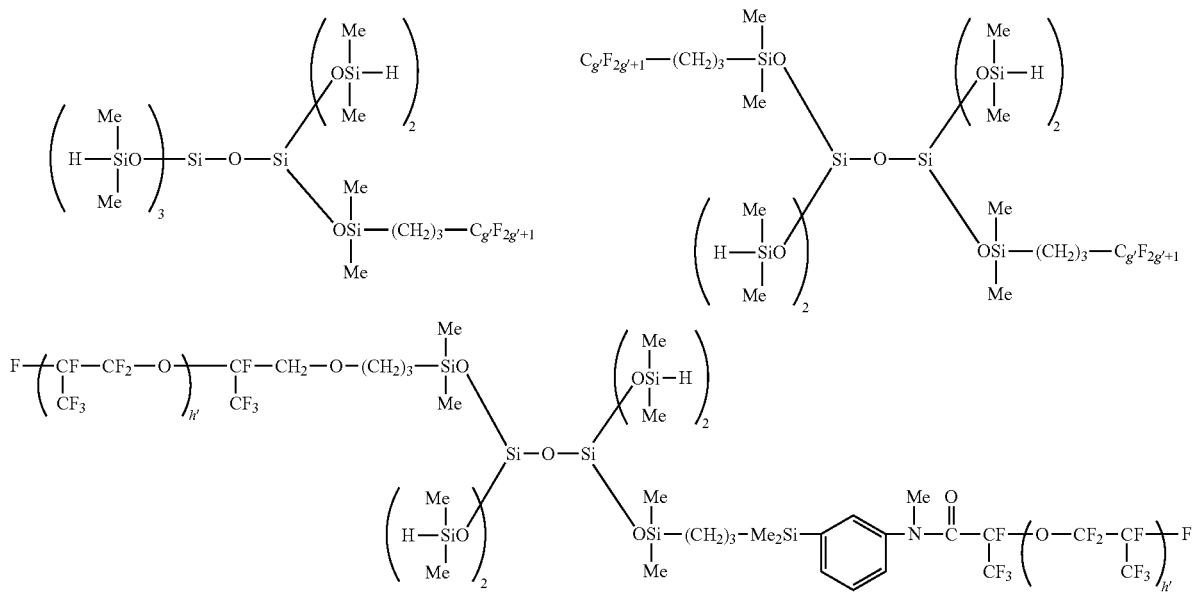
In the above formulae, g' represents an integer of 1 to 10; h' represents an integer of 1 to 50.
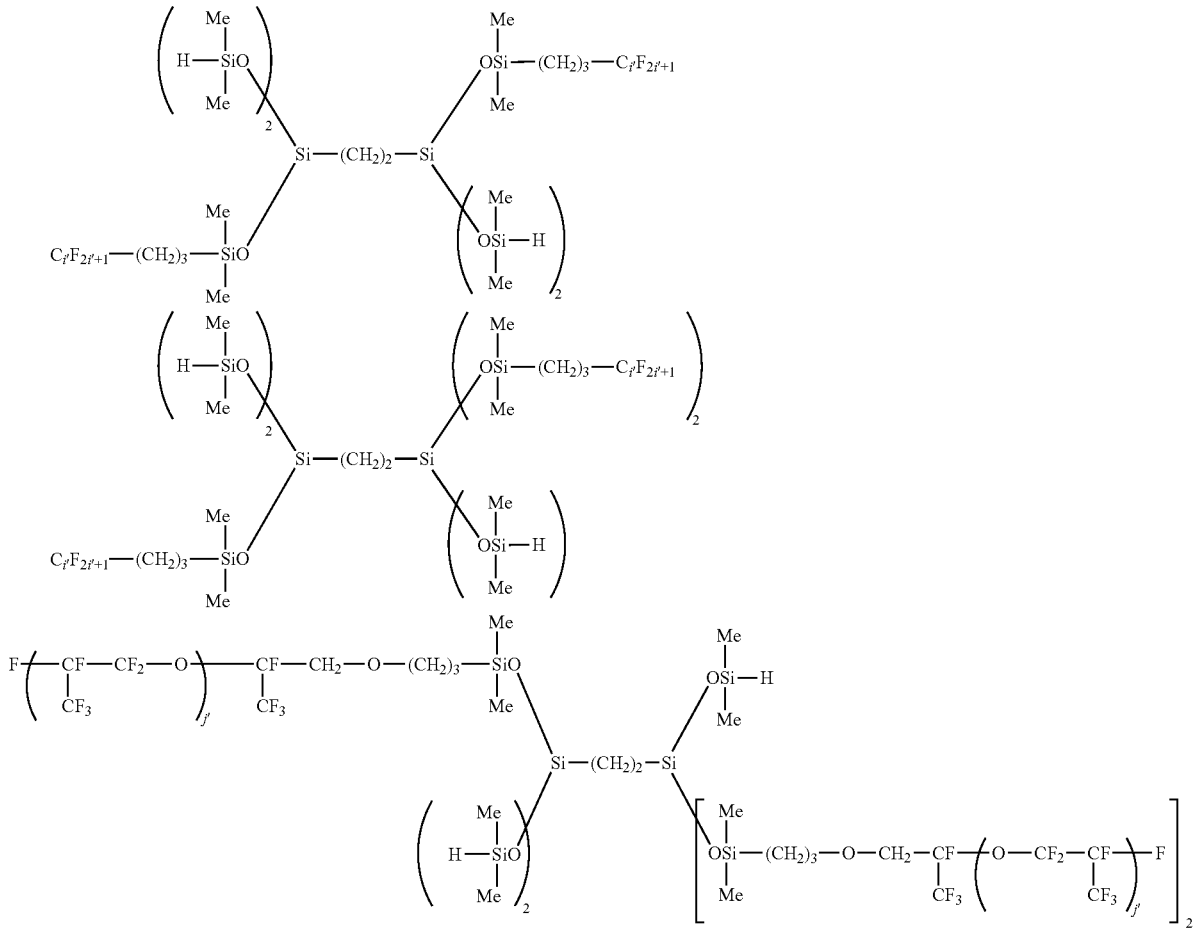
In the above formulae, i' represents an integer of 1 to 10; j' represents an integer of 1 to 50.

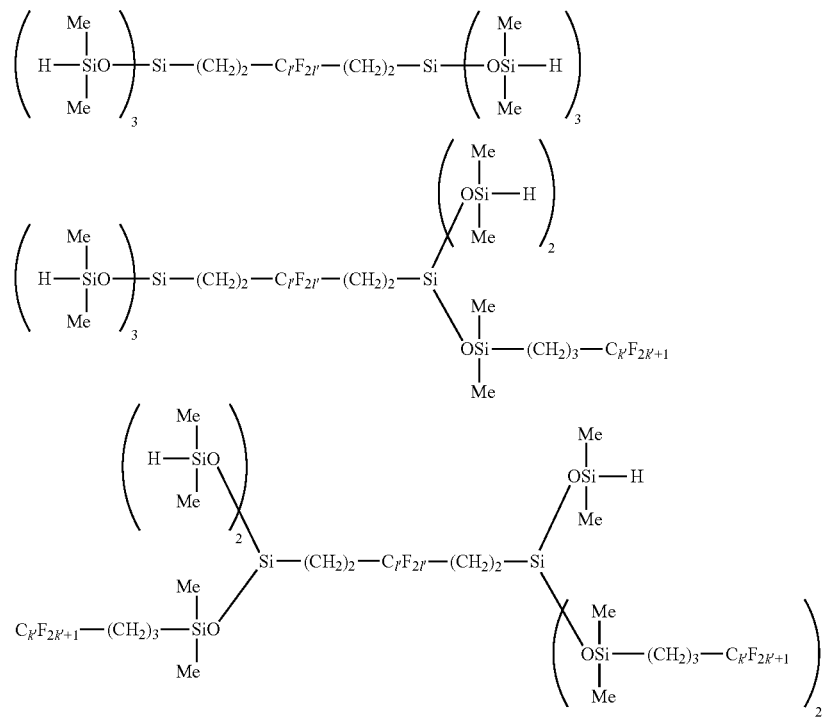
In the above formulae, k' represents an integer of 1 to 10; l' represents an integer of 1 to 20.
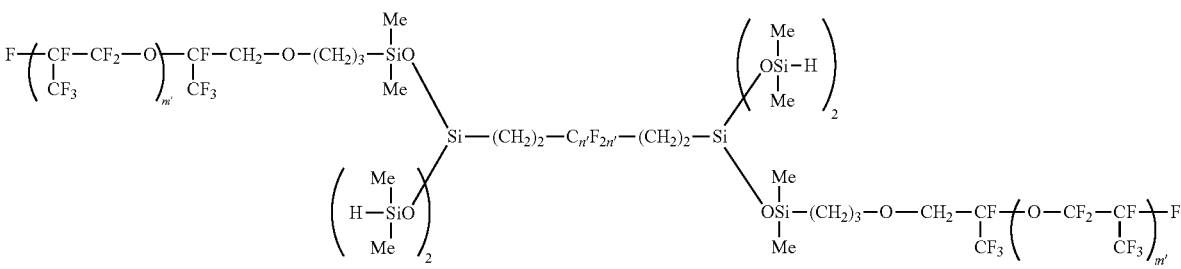
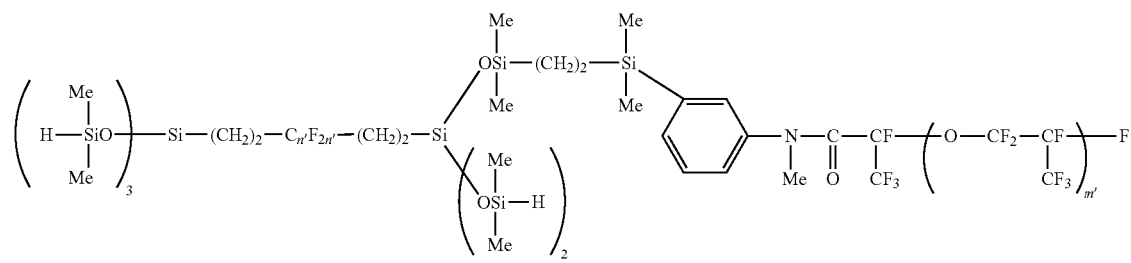
In the above formulae, m' represents an integer of 1 to 50; n' represents an integer of 1 to 20.
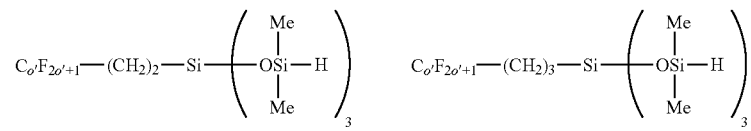

-continued
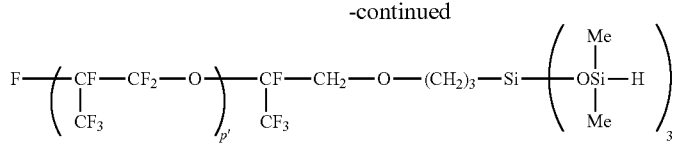
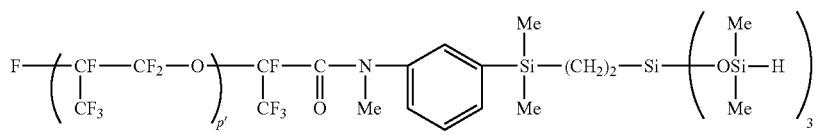
In the above formulae, o' represents an integer of 1 to 10; p' represents an integer of 1 to 50.
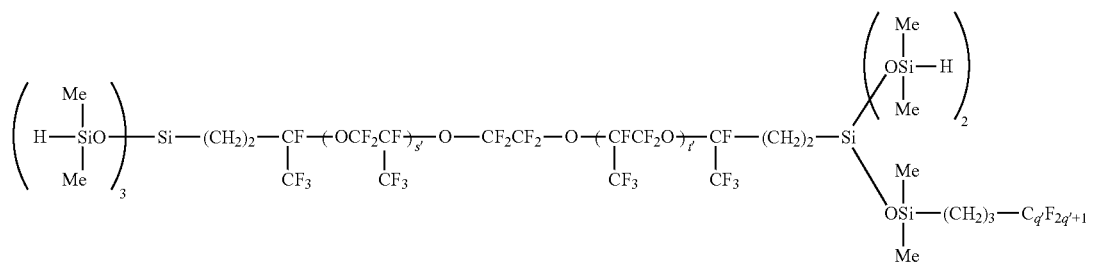
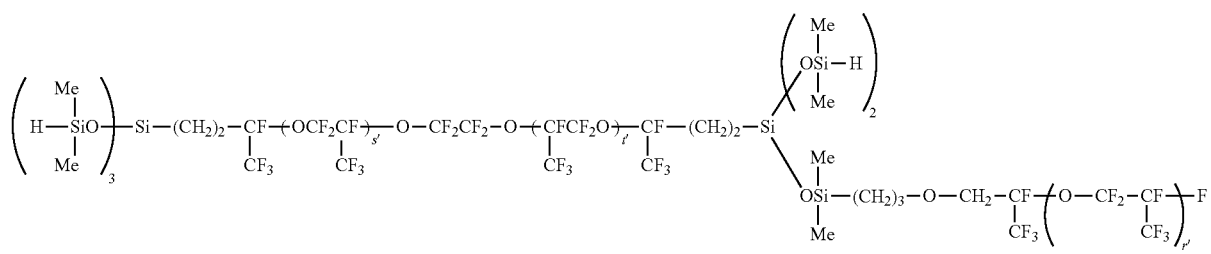
In the above formulae, q' represents an integer of 1 to 10; r' represents an integer of 1 to 50; each of s' and t' represents an integer of 1 to 100, provided that s'+t' is an integer of 2 to 200.
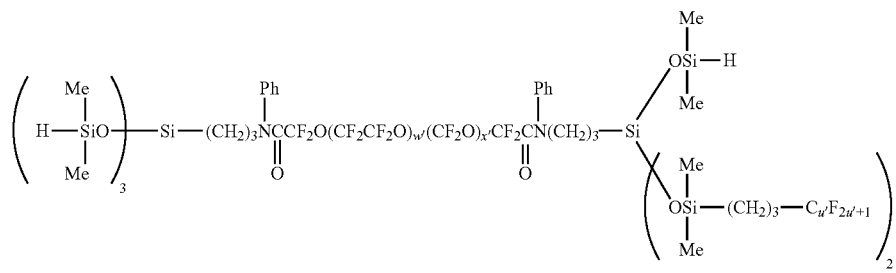

-continued

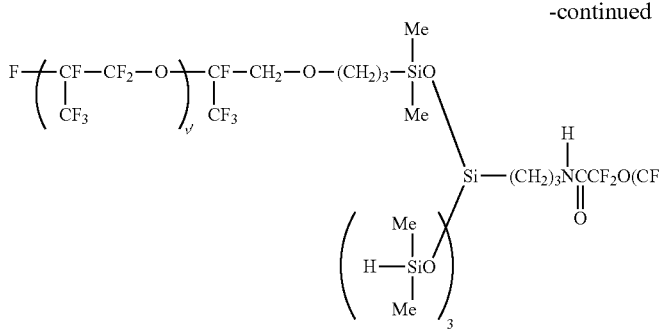
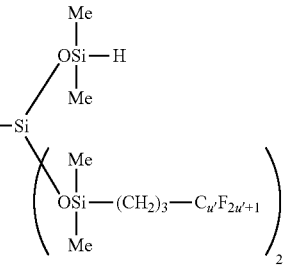

In the above formulae, u' represents an integer of 1 to 10; v' represents an integer of 1 to 50: each of w' and x' represents an integer of 1 to 50, provided that w'+x' is an integer of 2 to 100.

Any one kind of these components (B) may be used singularly, or two or more kinds of them may be used in combination.

The component (B) is added in an amount at which the silicon atom-bonded hydrogen atoms (SiH groups) in the component (B) will be in an amount (molar ratio) of 0.3 to 3 mol, preferably 0.5 to 2 mol, per 1 mol of the alkenyl groups in the component (A). When the SiH groups are in an amount of smaller than 0.3 mol, an insufficient degree of cross-linking may be exhibited; when the SiH groups are in an amount of larger than 3 mol, an impaired storage stability may be exhibited, and/or the cured product obtained after curing may exhibit an impaired heat resistance.

Component (C)

A component (C) is an alicyclic epoxy group-containing and fluorine-containing organohydrogensiloxane having in one molecule: a monovalent perfluoroalkyl or perfluorooxyalkyl group(s), or a divalent perfluoroalkylene or perfluorooxyalkylene group(s); and at least one silicon atom-bonded hydrogen atom (SiH group). The component (C) acts as an adhesion imparting agent for imparting a self-adhesiveness to the cured product obtained by curing the composition of the invention. Particularly, the component (C) clearly differs from the later-described component (E) in that the component (C) does not contain in its molecule cyclic carboxylic acid anhydride residues.

The aforementioned monovalent perfluoroalkyl group, monovalent perfluorooxyalkyl group, divalent perfluoroalkylene group and divalent perfluorooxyalkylene group are groups that are introduced in terms of, for example, compatibility, dispersibility and post-curing homogeneity with respect to the component (A). Examples of the monovalent perfluoroalkyl group or the monovalent perfluorooxyalkyl group include the groups represented by the above general formulae (5) or (6). Further, examples of the divalent perfluoroalkylene group or the divalent perfluorooxyalkylene group include the groups represented by the above general formulae (7) to (9).

Further, it is preferred that these monovalent perfluoroalkyl group, monovalent perfluorooxyalkyl group, divalent perfluoroalkylene group or divalent perfluorooxyalkylene group be linked to silicon atoms composing polysiloxane, through a divalent hydrocarbon group (linking group) that may contain a silicon atom, oxygen atom or nitrogen atom. Examples of such divalent hydrocarbon group include: an alkylene group, an arylene group and a combination thereof; or groups prepared by interposing into these groups, for example, at least one kind of structure selected from the group consisting of an ether bond oxygen atom, an amide bond, a carbonyl bond, an ester bond and a diorganosilylene group such as a dimethylsilylene group. The following groups each having 2 to 20 carbon atoms may thus be the examples of the divalent hydrocarbon group.

—$CH_2CH_2$—,

—$CH_2CH_2CH_2$—,

—$CH_2CH_2CH_2OCH_2$—,

—$CH_2CH_2CH_2$—NH—CO—,

—$CH_2CH_2CH_2$—N(Ph)-CO—,

—$CH_2CH_2CH_2$—N($CH_3$)—CO—,

—$CH_2CH_2CH_2$—N($CH_2CH_3$)—CO—,

—$CH_2CH_2CH_2$—N($CH(CH_3)_2$)—CO—,

—$CH_2CH_2CH_2$—O—CO—,

—$CH_2CH_2CH_2$—Si($CH_3$)$_2$—O—Si($CH_3$)$_2$—$CH_2CH_2CH_2$—,

—$CH_2OCH_2CH_2CH_2$—Si($CH_3$)$_2$—O—Si($CH_3$)$_2$—$CH_2CH_2$—,

—CO—N($CH_3$)-Ph'-Si($CH_3$)$_2$—$CH_2CH_2$—,

—CO—N($CH_3$)-Ph'-Si($CH_3$)$_2$—$CH_2CH_2$—Si($CH_3$)$_2$—O—Si($CH_3$)$_2$—$CH_2CH_2$—,

—CO—NH-Ph'-[Si($CH_3$)$_2$—$CH_2CH_2$]$_3$—$CH_2$—,

—CO—N($CH_3$)-Ph'-[Si($CH_3$)$_2$—$CH_2CH_2$]$_3$—

Provided that Ph represents a phenyl group; Ph' represents a phenylene group.

It is preferred that the alicyclic epoxy group contained in the component (C) be an epoxycyclohexyl group represented by the following formula (4).

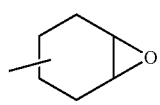

(4)

Examples of the component (C) include those represented by the following general formulae (17) to (21).

A general formula (17) is described below.

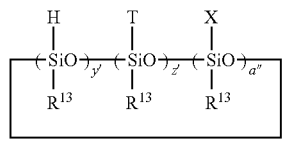

(17)

In the formula (17), y' represents an integer of 1 to 6, preferably an integer of 1 to 5; z' represents an integer of 1 to 4, preferably an integer of 1 to 3; and a" represents an integer of 1 to 4, preferably an integer of 1 to 3, provided that y'+z'+a" is an integer of 4 to 10, preferably an integer of 4 to 8. Further, each $R^{13}$ independently represents a substituted or unsubstituted monovalent hydrocarbon group; each T is independently identical to A as above; and each X independently represents an alicyclic epoxy group bonded to silicon atoms through a divalent hydrocarbon group that may have an oxygen atom. Here, there is no restriction on the binding order of —(Si(H)($R^{13}$)O)—, —(Si(T)($R^{13}$)O)— and —(Si(X)($R^{13}$)O)—.

In the general formula (17), each $R^{13}$ independently represents a substituted or unsubstituted monovalent hydrocarbon group, examples of which include those similar to the groups represented by $R^6$. Here, a methyl group and an ethyl group are preferred.

Further, each T is independently identical to A as above, representing the abovementioned monovalent perfluoroalkyl or perfluorooxyalkyl group that is bonded to silicon atoms through the divalent hydrocarbon group that may contain a silicon atom, oxygen atom or nitrogen atom. Examples of such monovalent perfluoroalkyl group or monovalent perfluorooxyalkyl group include the groups represented by the general formulae (5) or (6).

In addition, each X independently represents an alicyclic epoxy group bonded to silicon atoms through a divalent hydrocarbon group that may contain an oxygen atom. Examples of such alicyclic epoxy group include the group represented by the formula (4).

A general formula (18) is described below.

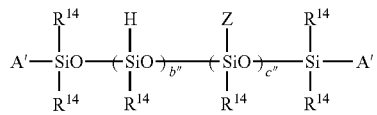

(18)

In the formula (18), each A' is independently identical to A as above; each Z is independently identical to X as above; and each $R^{14}$ is independently identical to $R^{13}$ as above. b" represents an integer of 2 to 50, preferably 3 to 30; c" represents an integer of 1 to 20, preferably 1 to 10, provided that b"+c" is an integer of 3 to 70, preferably an integer of 3 to 40. Here, there is no restriction on the binding order of —(Si(H)($R^{14}$)O)— and —(Si(Z)($R^{14}$)O)—.

In the general formula (18), each $R^{14}$ independently represents a substituted or unsubstituted monovalent hydrocarbon group, examples of which include those similar to the groups represented by $R^{13}$. Here, a methyl group and an ethyl group are preferred.

Further, each A' independently represents the abovementioned monovalent perfluoroalkyl or perfluorooxyalkyl group that is bonded to silicon atoms through the divalent hydrocarbon group that may contain a silicon atom, oxygen atom or nitrogen atom. Examples of such monovalent per-fluoroalkyl group or monovalent perfluorooxyalkyl group include the groups represented by the general formulae (5) or (6).

In addition, each Z independently represents an alicyclic epoxy group bonded to silicon atoms through a divalent hydrocarbon group that may contain an oxygen atom. Examples of such alicyclic epoxy group include the group represented by the formula (4).

A general formula (19) is described below.

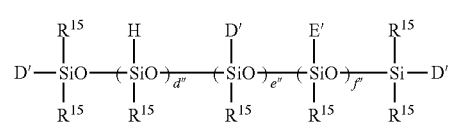

(19)

In the formula (19), each D' is independently identical to A as above; each E' is independently identical to X as above; and each $R^{15}$ is independently identical to $R^{13}$ as above. d" represents an integer of 2 to 50, preferably an integer of 3 to 30; e" represents an integer of 1 to 40, preferably an integer of 1 to 20; and f" represents an integer of 1 to 20, preferably an integer of 1 to 10, provided that d"+e"+f" is an integer of 4 to 110, preferably an integer of 4 to 60. Here, there is no restriction on the binding order of —(Si(H)($R^{15}$)O)—, —(Si(D')($R^{15}$)O)— and —(Si(E')($R^{15}$)O)—.

In the general formula (19), each $R^{15}$ independently represents a substituted or unsubstituted monovalent hydrocarbon group, examples of which include those similar to the groups represented by $R^{13}$. Here, a methyl group and an ethyl group are preferred.

Further, each D' independently represents the abovementioned monovalent perfluoroalkyl or perfluorooxyalkyl group that is bonded to silicon atoms through the divalent hydrocarbon group that may contain a silicon atom, oxygen atom or nitrogen atom. Examples of such monovalent perfluoroalkyl group or monovalent perfluorooxyalkyl group include the groups represented by the general formulae (5) or (6).

In addition, each E' independently represents an alicyclic epoxy group bonded to silicon atoms through a divalent hydrocarbon group that may contain an oxygen atom. Examples of such alicyclic epoxy group include the group represented by the formula (4).

A general formula (20) is described below.

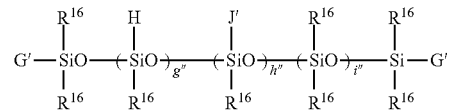

(20)

In the formula (20), each G' is independently identical to A as above; each J' is independently identical to X as above; and each $R^{16}$ is independently identical to $R^{13}$ as above. g" represents an integer of 2 to 50, preferably an integer of 3 to 30; h" represents an integer of 1 to 20, preferably an integer of 1 to 10; and i" represents an integer of 1 to 40, preferably an integer of 1 to 20, provided that g"+h"+i" is an integer of 4 to 110, preferably an integer of 5 to 60. Here, there is no restriction on the binding order of —(Si(H)($R^{16}$)O)—, —(Si(J')($R^{16}$)O)— and —(Si ($R^{16}$)$_2$O)—.

In the general formula (20), each $R^{16}$ independently represents a substituted or unsubstituted monovalent hydrocarbon group, examples of which include those similar to the groups represented by $R^{13}$. Here, a methyl group and an ethyl group are preferred.

Further, each G' independently represents the abovementioned monovalent perfluoroalkyl or perfluorooxyalkyl group that is bonded to silicon atoms through the divalent hydrocarbon group that may contain a silicon atom, oxygen atom or nitrogen atom. Examples of such monovalent perfluoroalkyl group or monovalent perfluorooxyalkyl group include the groups represented by the general formulae (5) or (6).

In addition, each J' independently represents an alicyclic epoxy group bonded to silicon atoms through a divalent hydrocarbon group that may contain an oxygen atom. Examples of such alicyclic epoxy group include the group represented by the formula (4).

A general formula (21) is described below.

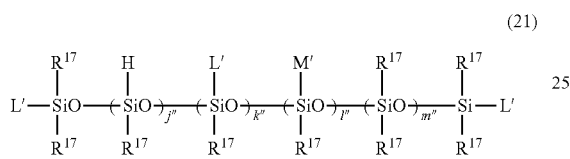

(21)

In the formula (21), each L' is independently identical to A as above; each M' is independently identical to X as above; and each $R^{17}$ is independently identical to $R^{13}$ as above. j" represents an integer of 2 to 50, preferably an integer of 3 to 30; k" represents an integer of 1 to 40, preferably an integer of 1 to 20; l" represents an integer of 1 to 20, preferably an integer of 1 to 10; and m" represents an integer of 1 to 40, preferably an integer of 1 to 20, provided that j"+k"+l"+m" is an integer of 5 to 150, preferably an integer of 5 to 80. Here, there is no restriction on the binding order of —(Si(H)($R^{17}$)O)—, —(Si(L')($R^{17}$)O)—, —(Si(M')($R^{17}$)O)— and —(Si($R^{17}$)$_2$O)—.

In the general formula (21), each $R^{17}$ independently represents a substituted or unsubstituted monovalent hydrocarbon group, examples of which include those similar to the groups represented by $R^{13}$. Here, a methyl group and an ethyl group are preferred.

Further, each L' independently represents the abovementioned monovalent perfluoroalkyl or perfluorooxyalkyl group that is bonded to silicon atoms through the divalent hydrocarbon group that may contain a silicon atom, oxygen atom or nitrogen atom. Examples of such monovalent perfluoroalkyl group or monovalent perfluorooxyalkyl group include the groups represented by the general formulae (5) or (6).

In addition, each M' independently represents an alicyclic epoxy group bonded to silicon atoms through a divalent hydrocarbon group that may contain an oxygen atom. Examples of such alicyclic epoxy group include the group represented by the formula (4).

Examples of the component (C) include the following compounds. Here, Me represents a methyl group, and Et represents an ethyl group.

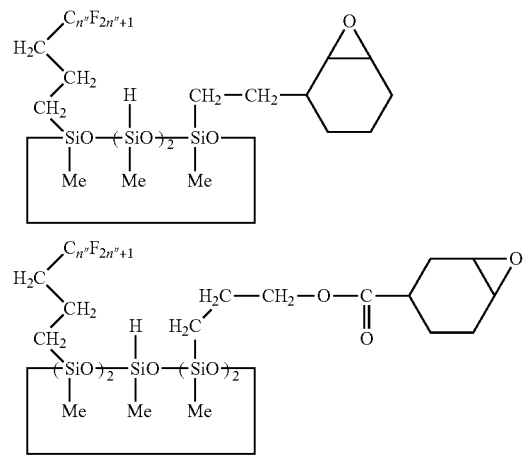

In the above formulae, n" represents an integer of 1 to 10.

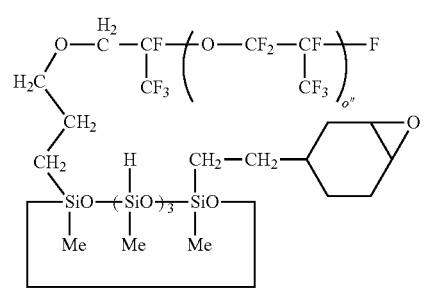

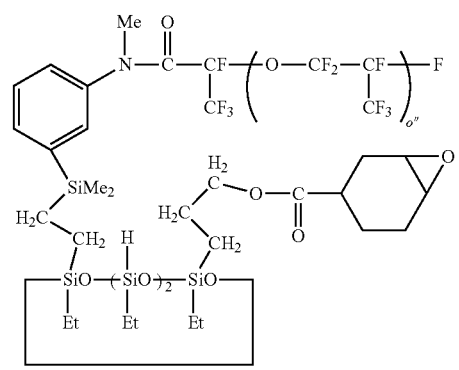

In the above formulae, o" represents an integer of 1 to 50.

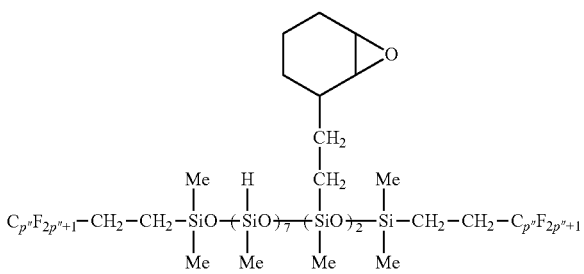

-continued
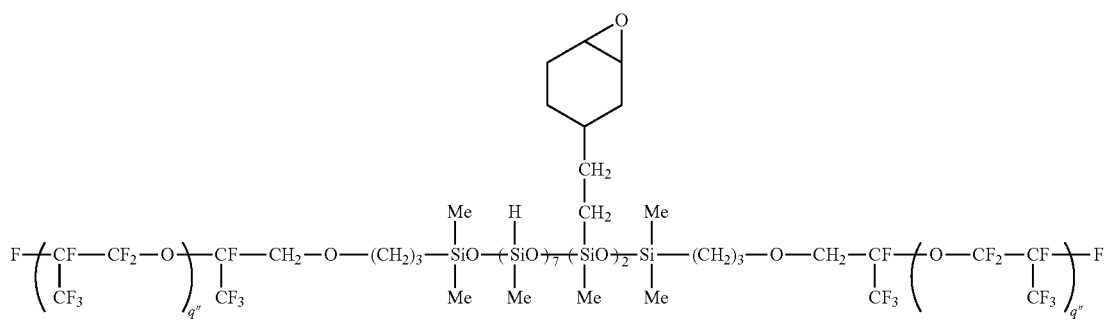
In the above formulae, p" represents an integer of 1 to 10.
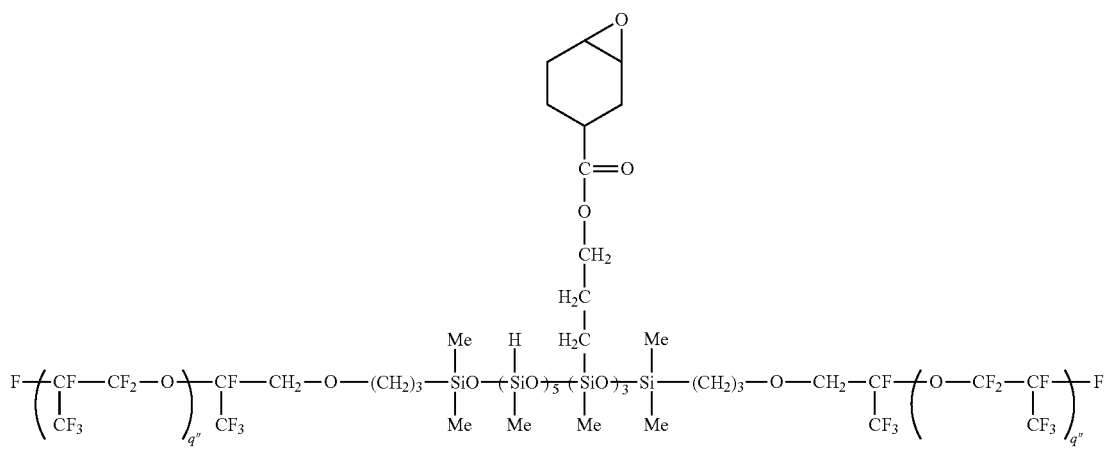
In the above formulae, q" represents an integer of 1 to 50.

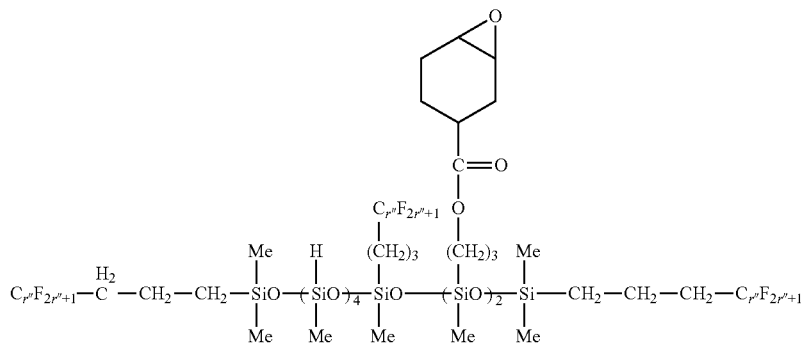
In the above formulae, r" represents an integer of 1 to 10.
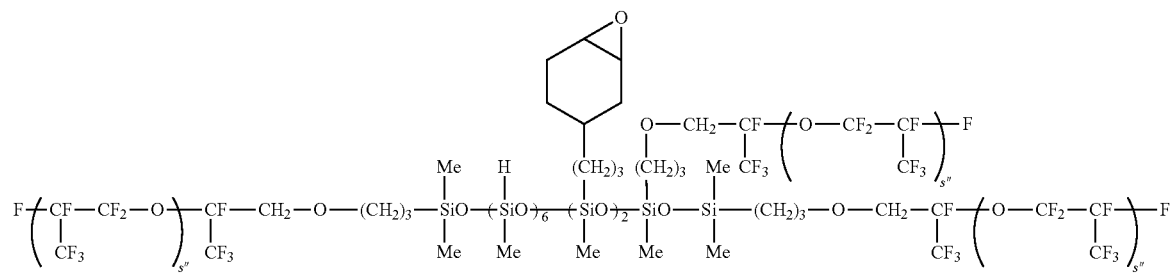
In the above formulae, s" represents an integer of 1 to 50.
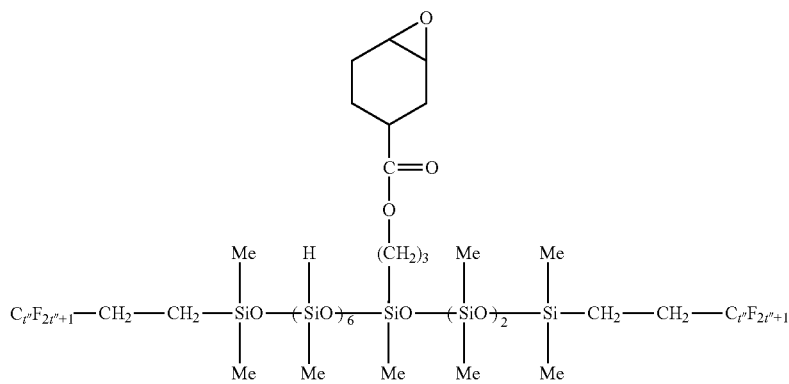
In the above formulae, t" represents an integer of 1 to 10.
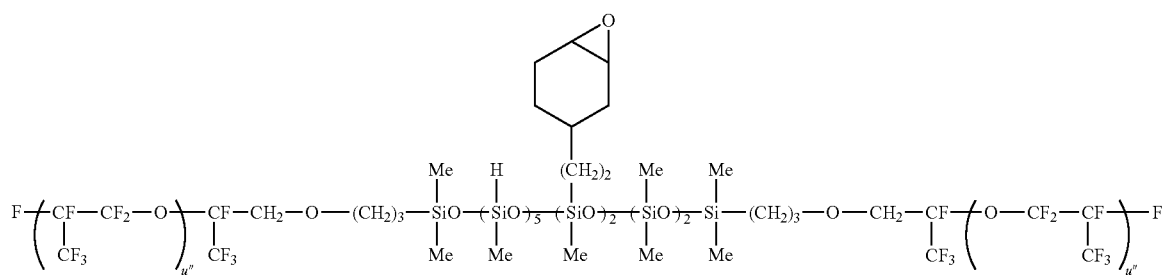
In the above formulae, u" represents an integer of 1 to 50.

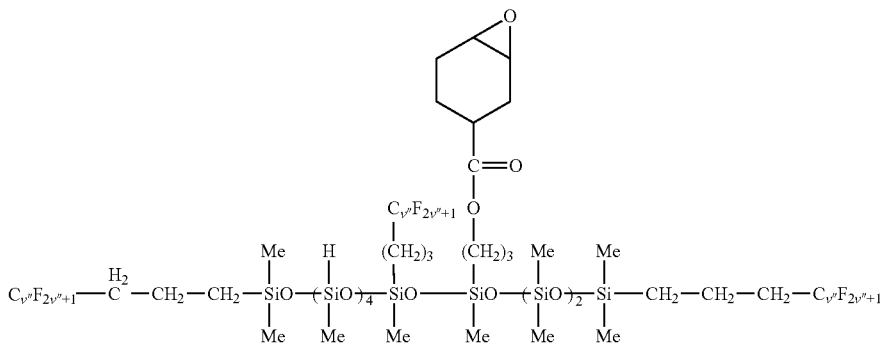

In the above formulae, v" represents an integer of 1 to 10.

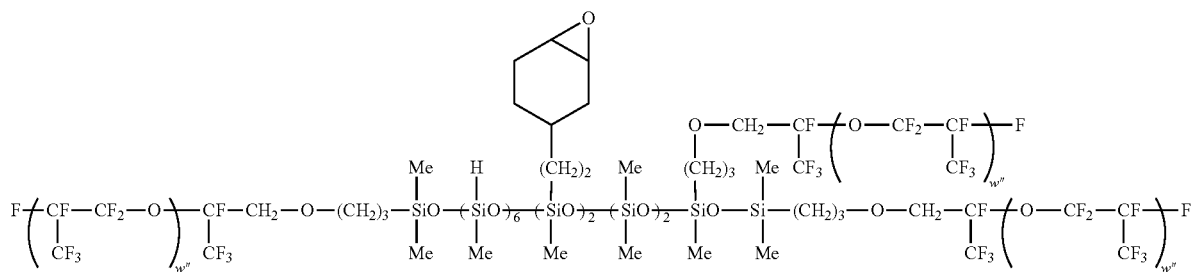

In the above formulae, w" represents an integer of 1 to 50.

Any one kind of these components (C) may be used singularly, or two or more kinds of them may be used in combination. The component (C) is added in an amount at which the silicon atom-bonded hydrogen atom(s) (SiH group(s)) in the component (C) will be in an amount (molar ratio) of 0.01 to 2 mol, preferably 0.05 to 1.5 mol, per 1 mol of the alkenyl groups in the component (A). When the SiH groups are in an amount of smaller than 0.01 mol, an insufficient adhesiveness may be exhibited; when the SiH groups are in an amount of larger than 2 mol, the fluidity of the composition of the invention may be impaired.

Component (D)

A platinum group metal-based catalyst as a component (D) is a hydrosilylation reaction catalyst. A hydrosilylation reaction catalyst is a catalyst for promoting addition reactions between the alkenyl groups contained in the composition, particularly the alkenyl groups in the component (A); and the SiH groups contained in the composition, particularly the SiH groups contained in the components (B) and (C). This hydrosilylation reaction catalyst is usually a noble metal or a compound thereof, and is thus expensive. Therefore, a relatively easily available platinum or platinum compound is often used.

Examples of such platinum compound include chloroplatinic acid; a complex of chloroplatinic acid and an olefin such as ethylene; a complex of platinum and an alcohol or vinylsiloxane; and metallic platinum supported on silica, alumina or carbon. Examples of a platinum group metal-based catalyst other than platinum or a compound thereof, also include rhodium-based, ruthenium-based, iridium-based, and palladium-based compounds (e.g. RhCl(PPh$_3$)$_3$, RhCl(CO)(PPh$_3$)$_2$, Ru$_3$(CO)$_{12}$, IrCl(CO)(PPh$_3$)$_2$ and Pd(PPh$_3$)$_4$). Here, in these formulae, Ph represents a phenyl group.

These catalysts are used as follows. That is, they may be used in the form of a solid, if they are solid catalysts. However, in order to obtain a more homogeneous cured product, it is preferred that a product prepared by dissolving chloroplatinic acid or a complex into an appropriate solvent such as toluene and ethanol be made compatible with the linear polyfluoro compound as the component (A).

The amount of the component (D) added is an effective amount as a hydrosilylation reaction catalyst. The component (D) is normally added in an amount of 0.1 to 2,000 ppm, preferably 0.1 to 500 ppm, and especially preferably 0.5 to 200 ppm (in terms of mass of platinum group metal atoms), with respect to the mass of the component (A). However, such amount of the component (D) may be appropriately increased or decreased depending on a desired curing rate.

Component (E)

It is preferred that the heat-curable fluoropolyether-based adhesive composition of the present invention contain the following component (E) as an optional component.

A component (E) is a carboxylic acid anhydride, and is added to improve the adhesion-imparting capability of the component (C), and promote the expression of the self-adhesiveness of the cured product obtained by curing the composition of the invention. As this component, there may be used those that are used as curing agents for epoxy resins.

The carboxylic acid anhydride as the component (E) may, for example, be a carboxylic acid anhydride that is solid at 23° C. Specifically, the following compounds are listed as the examples of the component (E). Here, in the following formulae, Me represents a methyl group.

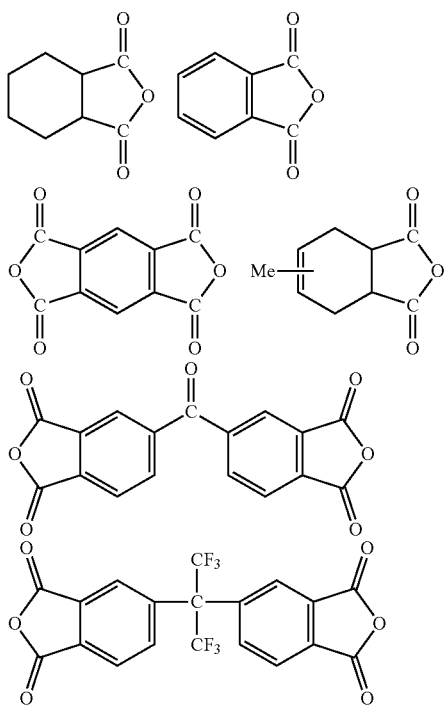

Further, the carboxylic acid anhydride as the component (E) may also be a cyclic organopolysiloxane (i.e. fluorine-containing organopolysiloxane-modified carboxylic acid anhydride compound) represented by the following general formula (22), such cyclic organopolysiloxane having in one molecule: a hydrogen atom bonded to a silicon atom; a monovalent perfluoroalkyl or perfluorooxyalkyl group bonded to a silicon atom through a divalent hydrocarbon group that may contain an oxygen atom or nitrogen atom; and a cyclic carboxylic acid anhydride residue bonded to a silicon atom through a divalent hydrocarbon group.

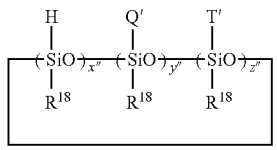

(22)

In the formula (22), x" represents an integer of 1 to 6, preferably an integer of 2 to 5; y" represents an integer of 1 to 4, preferably an integer of 1 to 3; and z" represents an integer of 1 to 4, preferably an integer of 1 to 3, provided that x"+y"+z" is an integer of 4 to 10, preferably an integer of 4 to 8. Here, there is no restriction on the binding order of —(Si(H)($R^{18}$)O)—, —(Si(Q')($R^{18}$)O)— and —(Si(T')($R^{18}$)O)—.

Further, $R^{18}$ represents a substituted or unsubstituted monovalent hydrocarbon group, examples of which include those similar to the substituted or unsubstituted monovalent hydrocarbon groups represented by $R^6$ as above.

Furthermore, Q' represents a monovalent perfluoroalkyl or perfluorooxyalkyl group bonded to a silicon atom through a divalent hydrocarbon group that may contain an oxygen atom or nitrogen atom, examples of which include groups similar to the groups represented by A as above. These groups are introduced in terms of, for example, compatibility, dispersibility and post-curing homogeneity with respect to the component (A).

Furthermore, as the divalent hydrocarbon group that links the monovalent perfluoroalkyl or perfluorooxyalkyl group to a silicon atom, and may contain an oxygen atom or nitrogen atom, there may be employed groups similar to the groups represented by A in the component (B).

Furthermore, T' represents a cyclic carboxylic acid anhydride residue bonded to a silicon atom through a divalent hydrocarbon group, specific examples of which include a group represented by the following general formula (23).

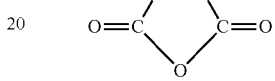

(23)

In the formula (23), $R^{19}$ represents a divalent hydrocarbon group having 1 to 15 carbon atoms, specific examples of which include a methylene group, an ethylene group, a propylene group and a butylene group, among which a propylene group is preferred.

Examples of the cyclic organopolysiloxane represented by the general formula (22) include the following compounds. Here, in the following formulae, Me represents a methyl group.

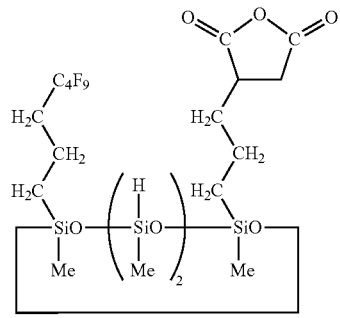

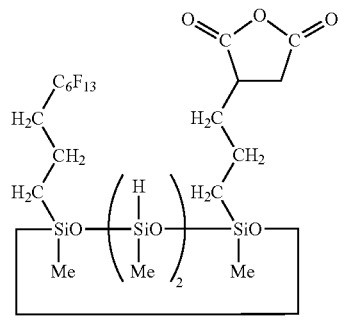

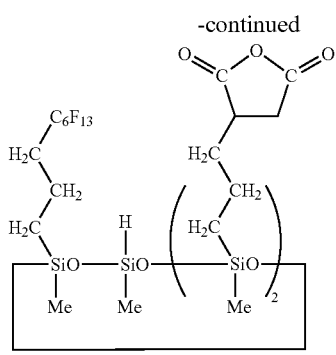
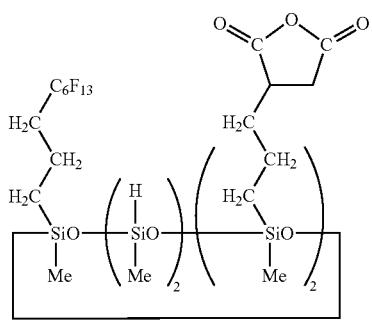
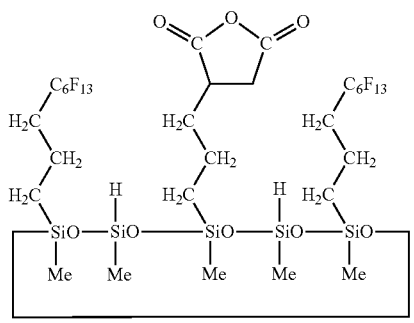
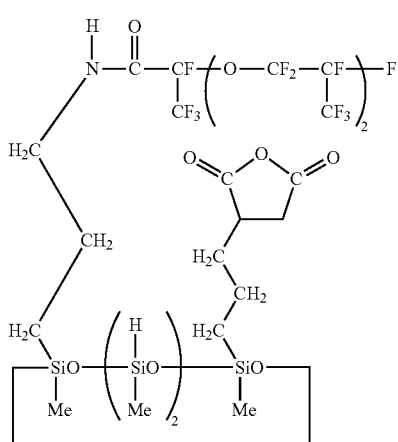
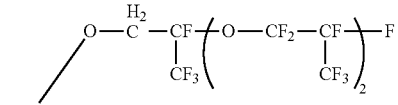
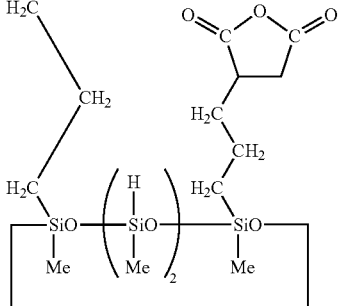
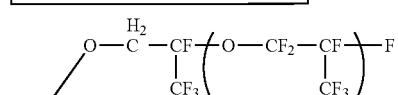
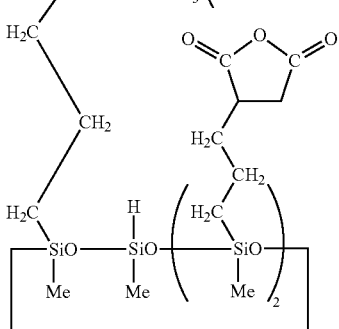
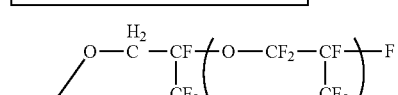
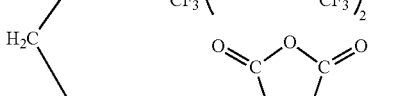
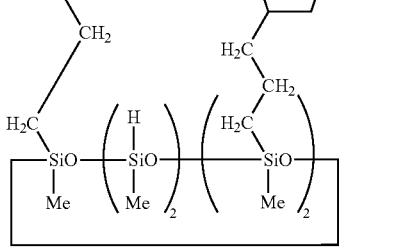
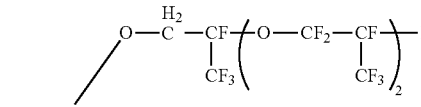
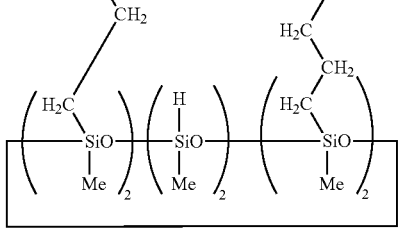

Any one kind of these components (E) may be used singularly, or two or more kinds of them may be used in combination. There, the abovementioned carboxylic acid anhydride that is solid at 23° C.; and the cyclic organopolysiloxane represented by the general formula (22) may be used in combination.

The component (E) is added in an amount of 0.010 to 10.0 parts by mass, preferably 0.10 to 5.0 parts by mass, per 100 parts by mass of the component (A). It is preferable when such amount is not smaller than 0.010 parts by mass, because there can be achieved a sufficient effect of promoting the expression of the adhesiveness of the composition of the invention. Meanwhile, it is also preferable when such amount is not larger than 10.0 parts by mass, because the fluidity of the composition of the invention can be improved, and the storage stability of this composition can be achieved as well.

Other Components

In order to improve the practicality of the heat-curable fluoropolyether-based adhesive composition of the invention, there may also be added thereto if required, as optional components, various compounding agents other than the components (A) to (E) such as a hydrosilylation addition reaction control agent (component (F)), an inorganic filler (component (G)), a plasticizer, a viscosity regulator and/or a flexibility imparting agent. These compounding agents may be added in an arbitrary amount as long as the objectives of the present invention are not hindered.

Examples of the hydrosilylation addition reaction control agent (component (F)) include acetylenic alcohols such as 1-ethynyl-1-hydroxycyclohexane, 3-methyl-1-butyne-3-ol, 3,5-dimethyl-1-hexine-3-ol, 3-methyl-1-pentene-3-ol, and phenylbutynol; a reactant of an acetylenic alcohol and a chlorosilane having either the monovalent perfluoroalkyl group(s) represented by the general formula (5) or the monovalent perfluorooxyalkyl group(s) represented by the general formula (6); 3-methyl-3-pentene-1-yne, 3,5-dimethyl-3-hexene-1-yne; triallyl isocyanurate; polyvinylsiloxane; and an organic phosphorous compound. By adding such component (F), curing reactivity and storage stability can be maintained at an appropriate level.

Examples of the inorganic filler (component (G)) include silica-based reinforcing fillers; reinforcing or quasi-reinforcing fillers such as a quartz powder, a molten quartz powder, diatom earth and calcium carbonate; inorganic pigments such as titanium oxide, ferric oxide, carbon black and cobalt aluminate; heat resistance improvers such as titanium oxide, ferric oxide, carbon black, cerium oxide, cerium hydroxide, zinc carbonate, magnesium carbonate and manganese carbonate; thermal conductivity imparting agents such as alumina, boron nitride, silicon carbide and a metal powder; and electric conductivity imparting agents such as carbon black, silver powder and a conductive zinc flower. Here, examples of the above silica-based reinforcing fillers include silica powders such as fumed silica (fumed silica or dry silica), precipitated silica (wet silica), spherical silica (molten silica), silica by sol-gel method, and silica aerogel; silica powders prepared by treating the surface of any of these silica powders with, for example, organochlorosilane, organodisilazane and/or cyclic organopolysilazane; and silica powders prepared by further treating any of these surface-treated silica powders with an organosilane or organosiloxane having the monovalent perfluoroalkyl group(s) represented by the general formula (5) or the monovalent perfluorooxyalkyl group(s) represented by the general formula (6).

As the plasticizer, viscosity regulator and flexibility imparting agent, there may be used linear polyfluoro compounds represented by the following general formulae (24) and (25); and/or a polyfluoromonoalkenyl compound represented by the following general formula (26).

$$F-(CF_2CF_2CF_2O)_{a'''}-X' \quad (24)$$

In the formula (24), X' is a group represented by $C_{b'''}F_{2b'''+1}-$ ($b'''$ represents an integer of 1 to 3); $a'''$ represents an integer of 1 to 500, preferably an integer of 2 to 300.

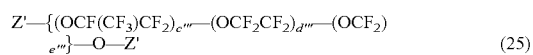
$$Z'-\{(OCF(CF_3)CF_2)_{c'''}-(OCF_2CF_2)_{d'''}-(OCF_2)_{e'''}\}-O-Z' \quad (25)$$

In the formula (25), Z' is identical to X' as above; each of $c'''$ and $d'''$ represents an integer of 0 to 300, preferably an integer of 0 to 150, provided that there does not exist a case where both $c'''$ and $d'''$ are 0. Further, $e'''$ represents an integer of 1 to 300, preferably an integer of 1 to 150. The repeating units may be randomly bonded to one another.

$$Rf\text{-}(A'')_{f'''}-CH=CH_2 \quad (26)$$

[In the formula (26), Rf is a group represented by the following general formula (27):

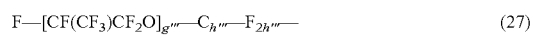
$$F-[CF(CF_3)CF_2O]_{g'''}-C_{h'''}-F_{2h'''}- \quad (27)$$

(In the formula (27), $g'''$ represents an integer of 1 to 200, preferably an integer of 1 to 150; $h'''$ represents an integer of 1 to 3);

A" represents $-CH_2-$, $-OCH_2-$, $-CH_2OCH_2-$ or $-CO-NR^{20}-D''-$ (provided that each of these groups has its left end bonded to Rf, and its right end bonded to a carbon atom; $R^{20}$ represents a hydrogen atom, a methyl group, a phenyl group or an allyl group; D" is $-CH_2-$, a group represented by the following structural formula (28), or a group represented by the following structural formula (29):

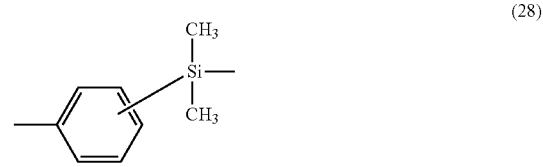

(28)

(Dimethyl phenylsilylene group exhibited at ortho position, meta position and para position, with its left end being bonded to a nitrogen atom, and its right end being bonded to a carbon atom)

(29)

Left end being bonded to a nitrogen atom, and right end being bonded to a carbon atom)); $f'''$ represents 0 or 1.]

Specific examples of the linear polyfluoro compounds represented by the general formulae (24) or (25) include the following compounds.

$$F-(CF_2CF_2CF_2O)_{i'''}-CF_2CF_3$$

$i'''$ represents an integer of 1 to 200.

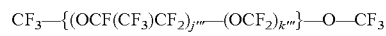
$$CF_3-\{(OCF(CF_3)CF_2)_{j'''}-(OCF_2)_{k'''}\}-O-CF_3$$

j''' represents an integer of 1 to 200; k''' represents an integer of 1 to 200. The repeating units may be randomly bonded to one another.

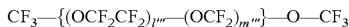

l''' represents an integer of 1 to 200; m''' represents an integer of 1 to 200. The repeating units may be randomly bonded to one another.

Any one kind of these linear polyfluoro compounds represented by the general formulae (24) or (25) may be used singularly, or two or more kinds of them may be used in combination.

Specific examples of the polyfluoromonoalkenyl compound represented by the general formula (26) include the following compounds. Here, in the following formulae, Me represents a methyl group.

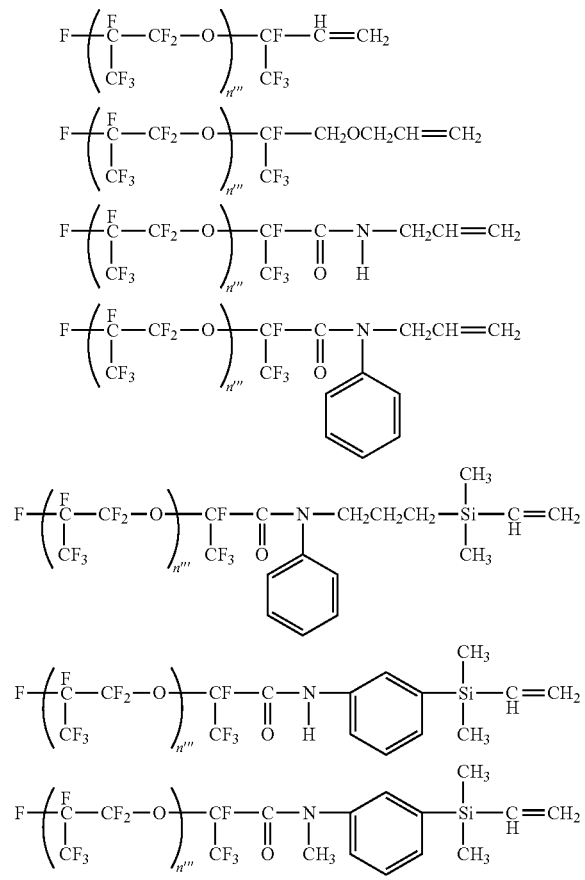

Here, n''' represents an integer of 1 to 200.

Any one kind of the polyfluoromonoalkenyl compounds represented by the general formulae (26) may be used singularly, or two or more kinds of them may be used in combination.

There are no particular restrictions on a method for producing the composition of the present invention. The composition of the invention can be produced by kneading the components (A) to (D); the components (E) to (G) as optional components; and other optional components. At that time, there may be used, as necessary, a mixing device such as a planetary mixer, a Ross mixer and a Hobart mixer; and/or a kneading device such as a kneader and a triple roll mill.

With regard to an embodiment of the composition of the invention, there may be employed one in which the components (A) to (G) and the optional components are all treated as one composition i.e. one-pack type; or a two-pack type in which the components (A) to (G) and the optional components are mixed together at the time of use.

Here, when using the composition of the invention, the composition, based on its intended use and purpose, may be dissolved to a desired concentration in an appropriate fluorine-based solvent such as 1,3-bis(trifluoromethyl)benzene, Fluorinert (by 3M Company), perfluorobutylmethyl ether and perfluorobutylethyl ether. Particularly, it is preferred that a solvent be used if the composition is employed for thin-film coating purpose.

Further, the viscosity of the composition of the invention at 23° C. as provided in JIS K7117-1 is 0.01 to 1,000 Pa·s, preferably 0.1 to 500 Pa·s. When such viscosity is not lower than 0.01 Pa·s, the composition exhibits a favorable fluidity and thus a superior workability as well. Also, when such viscosity is not higher than 1,000 Pa·s, a favorable leveling property (flattering property) is exhibited such that, for example, the composition can be uniformly applied to the surface of a base material.

The curing temperature of the composition of the invention is 120 to 200° C., preferably 140 to 180° C. When such curing temperature is not lower than 120° C., the composition of the invention is capable of expressing an adhesiveness to various types of base materials in a short period of time. Also, when such curing temperature is not higher than 200° C., there does not exist a concern that the composition of the invention may be degraded. In addition, as for the curing time of the composition of the invention, there may be appropriately selected, based on a curing temperature, a period of time for completing the cross-linking reaction and the adhesive reaction to a base material. Normally, it is preferred that such curing time be 10 to 50 min, more preferably 15 to 50 min. If the curing time is not shorter than 10 min, the composition of the invention is capable of expressing its adhesiveness to various types of base materials. Further, if the curing time is 50 min or shorter, it is effective in shortening the manufacturing time (takt time) of an electric/electronic component having, as a part of its elements, the cured product obtained by curing the composition of the invention.

Under the aforementioned curing conditions, the composition of the invention is capable of expressing, in a short period of time, a favorable adhesiveness to a base material made of a metal such as SUS304, a ceramic such as alumina ceramic or a plastic such as epoxy glass.

The cured product obtained via rapid curing of the composition of the invention is superior in, for example, heat resistance, chemical resistance, solvent resistance, mold releasability, water repellency, oil repellency and low-temperature property; and is capable of expressing a favorable adhesiveness to various kinds of base materials. For these reasons, the composition of the invention is favorable as an adhesive agent for use in electric/electronic components. Particularly, in the case of an adhesive agent for use in vehicular electric/electronic components, there are required high properties such as an acid resistance to, for example, NOx and SOx contained in exhaust gas. Thus, the cured product obtained by curing the composition of the invention is the most suitable in such case.

Working Example

The present invention is described in detail hereunder with reference to working and comparative examples. However, the invention is not limited to the following working examples. In the following examples, "part(s)" refers to "part(s) by mass," and Me represents a methyl group. Further, the viscosity of the component (A) is presented as a value measured at 23° C. (in accordance with JIS K6249).

Working Examples 1 to 4; Comparative Examples 1 to 4; Reference Examples 1 to 4

The components (A) to (G) used in the following working, comparative and reference examples are as follows. In the following examples, Me represents a methyl group.

Component (A)

(A-1): Linear polyfluoro compound represented by the following formula (30) (viscosity 10,900 mPa·s; vinyl group content 0.012 mol/100 g)

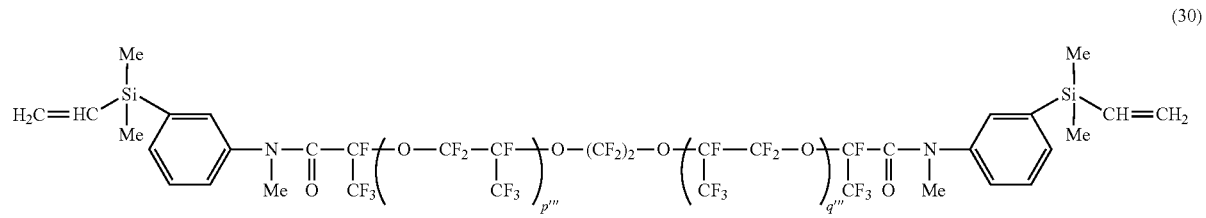

(30)

Provided that each of $p'''$ and $q'''$ represents an integer of not smaller than 1, and that an average value of $p'''+q'''$ is 90

(A-2): Linear polyfluoro compound represented by the following formula (31) (viscosity 11,000 mPa·s; vinyl group content 0.0122 mol/100 g)

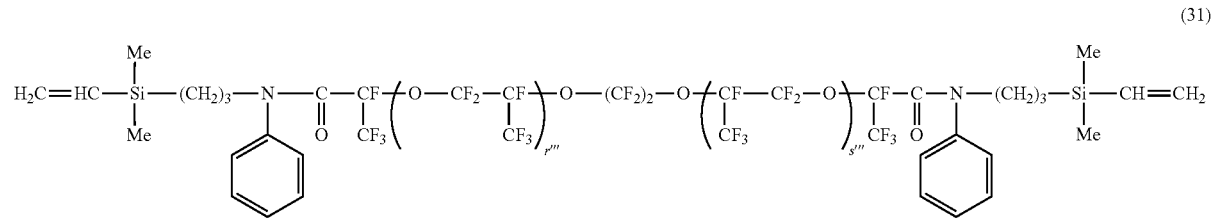

(31)

Provided that each of $r'''$ and $s'''$ represents an integer of not smaller than 1, and that an average value of $r'''+s'''$ is 90

Component (B)

(B-1): Fluorine-containing organohydrogensiloxane represented by the following formula (32) (SiH group content 0.00523 mol/g)

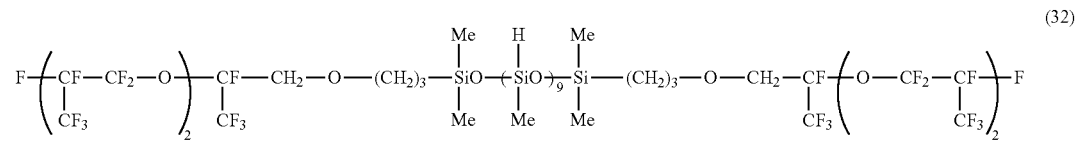

(32)

(B-2): Fluorine-containing organohydrogensiloxane represented by the following formula (33) (SiH group content 0.00394 mol/g)

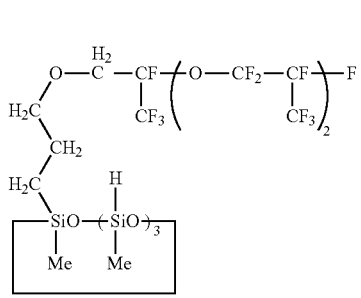
(33)

Component (C)

(C-1): Fluorine-containing organohydrogensiloxane represented by the following formula (34) (SiH group content 0.00317 mol/g)

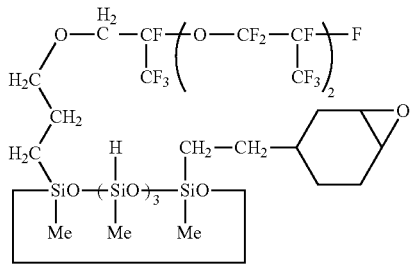
(34)

(C-2): Fluorine-containing organohydrogensiloxane represented by the following formula (35) (SiH group content 0.00356 mol/g)

(C-3): Fluorine-containing organohydrogensiloxane represented by the following formula (39) (SiH group content 0.00101 mol/g)

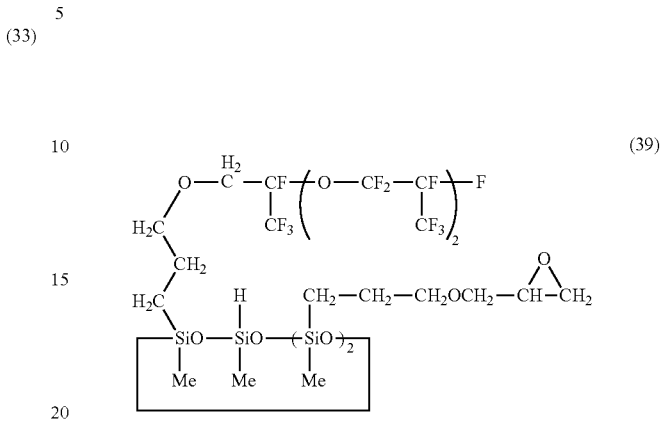
(39)

(C-4): Fluorine-containing organohydrogensiloxane represented by the following formula (40) (SiH group content 0.000922 mol/g)

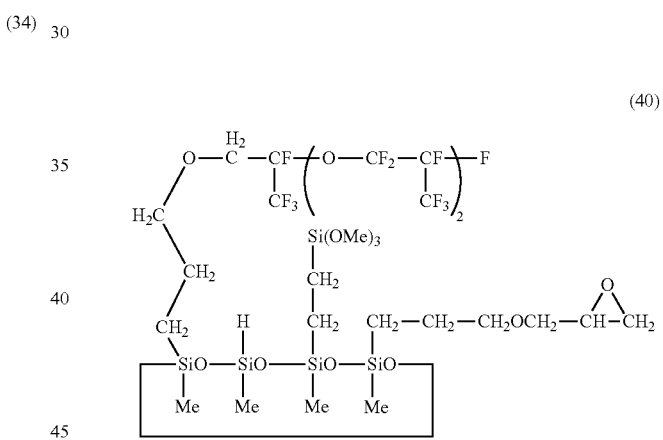
(40)

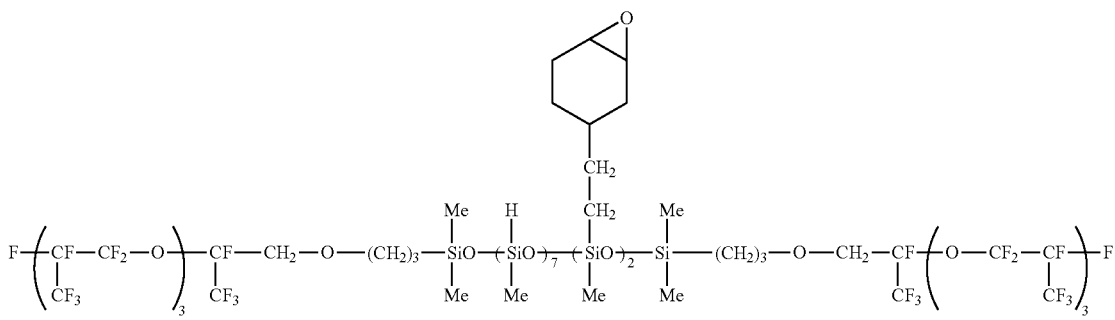
(35)

Component (D)

(D-1): Toluene solution of platinum-divinyltetramethyldisiloxane complex (platinum concentration 0.5% by mass)

Component (E)

(E-1): Carboxylic acid anhydride represented by the following formula (36)

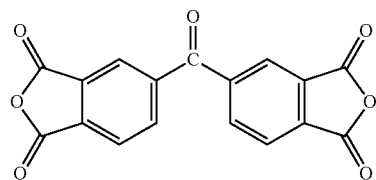

(36)

(E-2): Carboxylic acid anhydride residue-containing cyclic organopolysiloxane represented by the following formula (37)

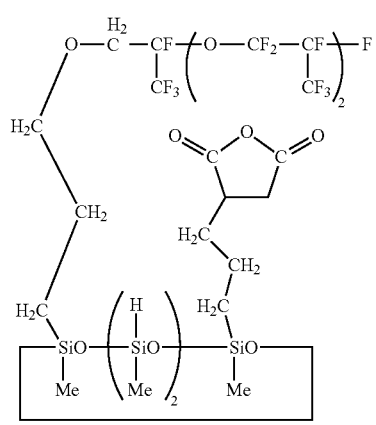

(37)

Component (F)

(F-1): Compound represented by the following formula (38)

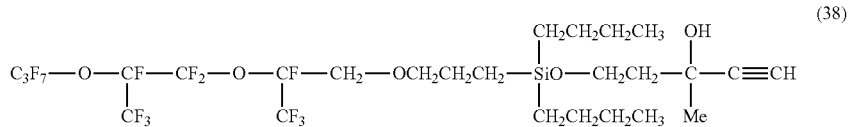

(38)

Component (G)

(G-1): Fumed silica; Aerosil R972 (product name by Aerosil Company)

In working examples 1 to 4, comparative examples 1 to 4, and reference examples 1 to 4, each composition was prepared using the components (A) to (G) by given amounts shown in Table 1, followed by molding and curing the composition so as to obtain a cured product thereof. In accordance with the following methods, measured were the viscosity of the composition; and a tensile shear adhesion strength of the cured product. The results thereof are shown in Table 1.

Preparation of Compositions in Working Examples 1 to 4, Comparative Examples 1 to 4, and Reference Examples 1 to 4

At first, the components (A) and (G) of the given amounts shown in Table 1 were kneaded for 30 min at room temperature, using a planetary mixer, followed by further kneading them for a hour at 150° C. under a reduced pressure of −98.0 kPaG. Next, the kneaded product was cooled to room temperature, followed by adding thereto the component (D) of the given amount shown in Table 1, and then kneading them for 30 min at room temperature. In the end, the components (B), (C), (E) and (F) of the given amounts shown in Table 1 were added thereto, followed by kneading them for another 30 min at room temperature to obtain the composition.

Viscosity of Composition

The viscosity of each of the compositions prepared in working examples 1 to 4, comparative examples 1 to 4, and reference examples 1 to 4, was measured at 23° C. in accordance with JIS K7117-1. The results thereof are shown in Table 1.

Tensile Shear Adhesion Strength

Working Examples 1 to 4; and Comparative Examples 1 to 4

Two pieces of 100 mm×25 mm test panels that were made of various kinds of base materials (SUS304, alumina ceramic and epoxy glass) were stacked together in a way such that the end portions of the two panels overlapped by 10 mm, and that a 1 mm layer of any of the compositions obtained in working examples 1 to 4 and comparative examples 1 to 4 was sandwiched therebetween. This composition was then cured after being heated at 150° C. for 15 min, thereby obtaining a test specimen of the cured product of each composition. Next, a tensile shear adhesion strength test was performed on such test specimen (tension rate 50 mm/min) in accordance with JIS K6850 in order to evaluate a tensile shear adhesion strength (MPa) and a ratio of cohesive failure (% by area). The results thereof are shown in Table 1.

Reference Examples 1 to 4

The tensile shear adhesion strength test was performed in the similar manner as above, except that the curing condition was: 150° C. for an hour. The results thereof are shown in Table 1.

TABLE 1

| Component (part by mass) | | Working example | | | | Comparative example | |
|---|---|---|---|---|---|---|---|
| | | 1 | 2 | 3 | 4 | 1 | 2 |
| (A)Component | (A-1) | 100 | — | 100 | — | 100 | — |
| | (A-2) | — | 100 | — | 100 | — | 100 |
| (B)Component | (B-1) | 1.61 | — | 1.61 | — | 1.38 | 1.63 |
| | (B-2) | — | 1.52 | — | 1.52 | 0.91 | 0.62 |
| (C)Component | (C-1) | 1.14 | — | 1.14 | — | — | — |
| | (C-2) | — | 1.69 | — | 1.69 | — | — |
| | (C-3) | — | — | — | — | 2.38 | — |
| | (C-4) | — | — | — | — | — | 2.60 |
| (D)Component | (D-1) | 0.2 | 0.2 | 0.2 | 0.2 | 0.2 | 0.2 |
| (E)Component | (E-1) | — | — | 0.5 | — | — | — |
| | (E-2) | — | — | — | 0.5 | — | — |
| (F)Component | (F-1) | 0.8 | 0.8 | 0.8 | 0.8 | 0.8 | 0.8 |
| (G)Component | (G-1) | 5 | 5 | 5 | 5 | 5 | 5 |
| SiH group in component (B)/vinyl group in component (A) (molar ratio) | | 0.7 | 0.5 | 0.7 | 0.5 | 0.9 | 0.9 |
| SiH group in component (C)/vinyl group in component (A) (molar ratio) | | 0.3 | 0.5 | 0.3 | 0.5 | 0.2 | 0.2 |
| Evaluation result | | | | | | | |
| Viscosity of composition(Pa · s) | | 117 | 202 | 135 | 189 | 89.6 | 83.0 |
| SUS304 | Tensile shear adhesion strength(MPa) | 1.1 | 1.2 | 1.3 | 1.4 | 0.4 | 0.4 |
| | Ratio of cohesive failure (% by area) | (80) | (90) | (100) | (100) | (0) | (0) |
| Alumina ceramic | Tensile shear adhesion strength(MPa) | 1.2 | 1.2 | 1.5 | 1.5 | 0.4 | 0.5 |
| | Ratio of cohesive failure (% by area) | (90) | (90) | (100) | (100) | (0) | (10) |
| Epoxy glass | Tensile shear adhesion strength(MPa) | 1.2 | 1.3 | 1.5 | 1.6 | 0.5 | 0.5 |
| | Ratio of cohesive failure (% by area) | (100) | (100) | (100) | (100) | (10) | (10) |

| Component (part by mass) | | Comparative example | | Reference example | | | |
|---|---|---|---|---|---|---|---|
| | | 3 | 4 | 1 | 2 | 3 | 4 |
| (A)Component | (A-1) | 100 | — | 100 | — | 100 | — |
| | (A-2) | — | 100 | — | 100 | — | 100 |
| (B)Component | (B-1) | 1.38 | 1.63 | 1.38 | 1.63 | 1.38 | 1.63 |
| | (B-2) | 0.91 | 0.62 | 0.91 | 0.62 | 0.91 | 0.62 |
| (C)Component | (C-1) | — | — | — | — | — | — |
| | (C-2) | — | — | — | — | — | — |
| | (C-3) | 2.38 | — | 2.38 | — | 2.38 | — |
| | (C-4) | — | 2.60 | — | 2.60 | — | 2.60 |
| (D)Component | (D-1) | 0.2 | 0.2 | 0.2 | 0.2 | 0.2 | 0.2 |
| (E)Component | (E-1) | 0.5 | — | — | — | 0.5 | — |
| | (E-2) | — | 0.5 | — | — | — | 0.5 |
| (F)Component | (F-1) | 0.8 | 0.8 | 0.8 | 0.8 | 0.8 | 0.8 |
| (G)Component | (G-1) | 5 | 5 | 5 | 5 | 5 | 5 |
| SiH group in component (B)/vinyl group in component (A) (molar ratio) | | 0.9 | 0.9 | 0.9 | 0.9 | 0.9 | 0.9 |
| SiH group in component (C)/vinyl group in component (A) (molar ratio) | | 0.2 | 0.2 | 0.2 | 0.2 | 0.2 | 0.2 |
| Evaluation result | | | | | | | |
| Viscosity of composition(Pa · s) | | 97.6 | 75.2 | 89.6 | 83.0 | 97.6 | 75.2 |
| SUS304 | Tensile shear adhesion strength(MPa) | 0.6 | 0.6 | 1.0 | 1.0 | 1.2 | 1.2 |
| | Ratio of cohesive failure (% by area) | (20) | (20) | (80) | (80) | (100) | (100) |
| Alumina ceramic | Tensile shear adhesion strength(MPa) | 0.6 | 0.6 | 1.1 | 1.0 | 1.4 | 1.3 |
| | Ratio of cohesive failure (% by area) | (20) | (20) | (90) | (80) | (100) | (100) |
| Epoxy glass | Tensile shear adhesion strength(MPa) | 0.6 | 0.6 | 1.1 | 1.1 | 1.4 | 1.4 |
| | Ratio of cohesive failure (% by area) | (20) | (20) | (90) | (90) | (100) | (100) |

With regard to the compositions prepared in working examples 1 to 4, each composition was cured after being heated at 150° C. for 15 min, and then exhibited a favorable adhesiveness to each type of base material. However, with regard to the compositions prepared in comparative examples 1 to 4, since the component (C) (component (C-3) or (C-4)) did not have an alicyclic epoxy group in its molecule, a sufficient adhesiveness could not be achieved by heating at 150° C. for 15 min. As shown in reference examples 1 to 4, in order for the compositions prepared in comparative examples 1 to 4 to exhibit a favorable adhesiveness to each type of base material at the same level as the working examples, these compositions had to be heated at 150° C. for an hour. These results clearly indicate that the compositions of working examples 1 to 4 are capable of expressing a favorable adhesiveness to each type of base material in a shorter period of time as compared to the compositions of comparative examples 1 to 4.

According to the above results, since the composition of the present invention is capable of being cured and adhering to a base material made of, for example, a metal, ceramic and/or plastic in a short period of time, the composition of the invention is effective in shortening the manufacturing time (takt time) of an electric/electronic component, especially a vehicular electric/electronic component, if the composition is used as an adhesive agent for such component.

What is claimed is:

1. A heat-curable fluoropolyether-based adhesive composition comprising:
   (A) 100 parts by mass of a linear polyfluoro compound having at least two alkenyl groups in one molecule, and a perfluoropolyether structure in a main chain;
   (B) an alicyclic epoxy group-free and fluorine-containing organohydrogensiloxane having in one molecule: a monovalent perfluoroalkyl or perfluorooxyalkyl group(s), or a divalent perfluoroalkylene or perfluorooxyalkylene group(s); and at least two silicon atom-bonded hydrogen atoms (SiH groups), the component (B) being in an amount at which the SiH groups therein are in an amount of 0.3 to 3 mol per 1 mol of the alkenyl groups in the component (A);
   (C) an alicyclic epoxy group-containing and fluorine-containing organohydrogensiloxane having in one molecule: a monovalent perfluoroalkyl or perfluorooxyalkyl group(s), or a divalent perfluoroalkylene or perfluorooxyalkylene group(s); and at least two silicon atom-bonded hydrogen atoms (SiH groups), the component (C) being in an amount at which the SiH groups therein are in an amount of 0.01 to 2 mol per 1 mol of the alkenyl groups in the component (A); and
   (D) a platinum group metal-based catalyst, the component (D) being in an amount of 0.1 to 2,000 ppm in terms of mass of platinum group metal atoms with respect to the component (A).

2. The heat-curable fluoropolyether-based adhesive composition according to claim 1, further comprising:
   (E) a carboxylic acid anhydride, the component (E) being in an amount of 0.010 to 10.0 parts by mass per 100 parts by mass of the component (A).

3. The heat-curable fluoropolyether-based adhesive composition according to claim 1, wherein the alkenyl groups are contained in the linear polyfluoro compound as the component (A) by an amount of 0.005 to 0.3 mol/100 g.

4. The heat-curable fluoropolyether-based adhesive composition according to claim 1, wherein the perfluoropolyether structure in the component (A) includes a structure represented by the following general formula (1):

$$—(C_aF_{2a}O)_b— \quad (1)$$

wherein a represents an integer of 1 to 6, and b represents an integer of 1 to 300.

5. The heat-curable fluoropolyether-based adhesive composition according to claim 1, wherein the component (A) comprises a linear polyfluoro compound represented by the following general formula (2) and/or a linear polyfluoro compound represented by the following general formula (3):

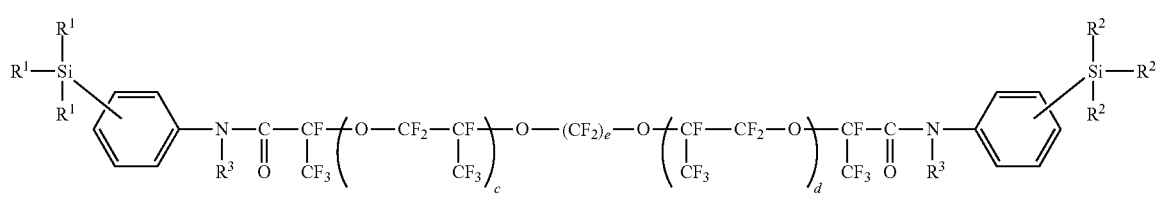

(2)

wherein each of $R^1$ and $R^2$ represents an alkenyl group, or a substituted or unsubstituted monovalent hydrocarbon group having no aliphatic unsaturated bond, where $R^1$s are independent from one another, $R^2$s are also independent from one another, and at least two of these $R^1$s and $R^2$s in total are alkenyl groups; each $R^3$ independently represents a hydrogen atom, or a substituted or unsubstituted monovalent hydrocarbon group; each of c and d represents an integer of 1 to 150, provided that an average value of c+d is 2 to 300; and e represents an integer of 1 to 6,

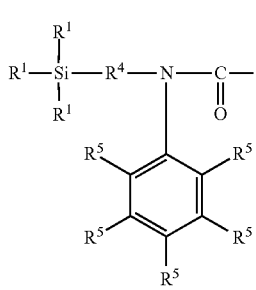 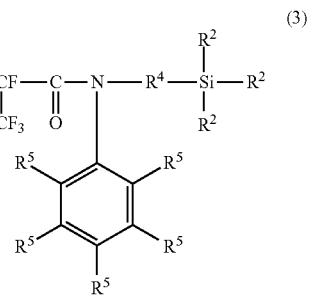

(3)

wherein each $R^4$ independently represents an alkylene group having 1 to 6 carbon atoms; each $R^5$ independently represents a hydrogen atom, or an alkyl group that has 1 to 4 carbon atoms and may be fluorine-substituted; each of $R^1$ and $R^2$ represents an alkenyl group, or a substituted or unsubstituted monovalent hydrocarbon group having no aliphatic unsaturated bond, where $R^1$s are independent from one another, $R^2$s are also independent from one another, and at least two of these $R^1$s and $R^2$s in total are alkenyl groups; each of c and d represents an integer of 1 to 150, provided that an average value of c+d is 2 to 300; and e represents an integer of 1 to 6.

6. The heat-curable fluoropolyether-based adhesive composition according to claim 1, wherein the alicyclic epoxy group contained in the component (C) is an epoxycyclohexyl group represented by the following formula (4):

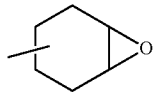

(4)

7. An electric/electronic component having a cured product of the heat-curable fluoropolyether-based adhesive composition as set forth in claim 1.

8. The electric/electronic component according to claim 7, wherein the electric/electronic component is a vehicular electric/electronic component.

9. The heat-curable fluoropolyether-based adhesive composition according to claim 2, wherein the alkenyl groups are contained in the linear polyfluoro compound as the component (A) by an amount of 0.005 to 0.3 mol/100 g.

10. The heat-curable fluoropolyether-based adhesive composition according to claim 1, wherein the alicyclic epoxy group-containing and fluorine-containing organohydrogensiloxane as the component (C) has at least three silicon atom-bonded hydrogen atoms (SiH groups).

* * * * *